US009729665B2

(12) United States Patent
Ueno et al.

(10) Patent No.: US 9,729,665 B2
(45) Date of Patent: Aug. 8, 2017

(54) CONTENT TRANSMISSION METHOD, CONTENT TRANSMISSION DEVICE, AND RECORDING MEDIUM

(71) Applicant: FUJITSU LIMITED, Kawasaki-shi, Kanagawa (JP)

(72) Inventors: Hitoshi Ueno, Kawasaki (JP); Kenichi Abiru, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 14/821,252

(22) Filed: Aug. 7, 2015

(65) Prior Publication Data

US 2016/0050288 A1  Feb. 18, 2016

(30) Foreign Application Priority Data

Aug. 14, 2014  (JP) .................................. 2014-165149

(51) Int. Cl.
  *H04L 12/803* (2013.01)
  *H04L 29/08* (2006.01)

(52) U.S. Cl.
  CPC ........ *H04L 67/2842* (2013.01); *H04L 67/101* (2013.01); *H04L 67/1008* (2013.01); *H04L 67/325* (2013.01); *H04L 47/122* (2013.01)

(58) Field of Classification Search
  CPC . H04L 67/2842; H04L 67/325; H04L 67/101; H04L 67/1008; H04L 47/122
  See application file for complete search history.

(56) References Cited

U.S. PATENT DOCUMENTS

| 7,089,301 B1 * | 8/2006 | Labio ................ G06F 17/30206 707/E17.032 |
| 7,123,921 B1 * | 10/2006 | Schulz .................. H04W 48/20 455/452.1 |
| 7,610,359 B2 * | 10/2009 | Yoon ..................... G11B 27/105 386/248 |
| 2002/0016162 A1 | 2/2002 | Yoshihara et al. |
| 2006/0209675 A1 * | 9/2006 | Jacobson .............. H04W 48/08 370/216 |
| 2008/0219435 A1 * | 9/2008 | Kodama ............... H04L 9/3242 380/28 |

(Continued)

FOREIGN PATENT DOCUMENTS

JP  2002-049766 A  2/2002
JP  2006-171822 A  6/2006

*Primary Examiner* — Oanh Duong
(74) *Attorney, Agent, or Firm* — Oblon, McClelland, Maier & Neustadt, L.L.P.

(57) ABSTRACT

A content transmission method including: searching, when a first information processing device receives a transmission request for a first content from a second information processing device, for a third information processing device within information processing devices, at least one of the information processing devices having a connection with the second information processing device and currently transmitting a second content to the second information processing device; and transmitting to the third information processing device, by the first information processing device, the first content and an instruction to transmit the transmitted first content from the third information processing device to the second information processing device in accordance with the transmission request.

9 Claims, 26 Drawing Sheets

(56) References Cited

U.S. PATENT DOCUMENTS

| | | | | |
|---|---|---|---|---|
| 2009/0024991 | A1* | 1/2009 | Campbell | H04L 67/06 717/173 |
| 2009/0043858 | A1* | 2/2009 | Park | H04L 12/581 709/206 |
| 2010/0138555 | A1* | 6/2010 | Gerber | H04L 12/66 709/232 |
| 2010/0211637 | A1* | 8/2010 | Borzsei | G06Q 50/01 709/204 |
| 2012/0202479 | A1* | 8/2012 | Sugitani | G08C 17/02 455/420 |
| 2012/0239831 | A1* | 9/2012 | Ueno | H04L 67/28 710/33 |
| 2012/0252458 | A1* | 10/2012 | Ohnishi | H04L 43/062 455/436 |
| 2013/0159547 | A1* | 6/2013 | Miyao | H04N 21/222 709/233 |
| 2014/0143431 | A1* | 5/2014 | Watson | H04L 65/4084 709/227 |
| 2015/0170208 | A1* | 6/2015 | Karamchedu | G06Q 30/0264 705/14.61 |
| 2015/0172985 | A1* | 6/2015 | Gangadhar | H04W 36/22 370/332 |
| 2015/0207691 | A1* | 7/2015 | Price | H04L 67/2847 709/217 |

\* cited by examiner

FIG. 3

| GROUP ID | CONTENT ID | SIZE (Mb) |
|---|---|---|
| Gr1 | abc | 50 |
| Gr2 | def | 30 |
| ⋮ | ⋮ | ⋮ |

| CONTENT ID | CONTENT ID |
|---|---|
| abc | CS201 |
| abc | CS204 |
| def | CS202 |
| ⋮ | ⋮ |

| CS-ID | THROUGHPUT (Mbps) | NUMBER OF HOPS |
|---|---|---|
| CS201 | 2 | 7 |
| CS202 | 2 | 7 |
| CS203 | 5 | 5 |
| CS204 | 5 | 5 |
| CS205 | 25 | 2 |

| PARAMETER NAME | VALUE |
|---|---|
| UPPER LIMIT OF NUMBER OF SIMULTANEOUS CONNECTIONS | 20 |
| UPPER LIMIT TIME OF PRELIMINARY DEPLOYMENT | 45 SECONDS |

| CS-ID | CONTENT ID | SIZE (Mb) | START TIME | ~104 |
|-------|------------|-----------|------------|------|
| CS205 | def | 30 | – | |

FIG. 9

| CS-ID | CONTENT ID | REMAINING SIZE (Mb) |
|---|---|---|
| CS205 | abc | 20 |

| PARAMETER NAME | VALUE |
|---|---|
| UPPER LIMIT OF NUMBER OF SIMULTANEOUS CONNECTIONS | 20 |
| UPPER LIMIT OF RESERVATION LIST | 10 |
| UPPER LIMIT TIME OF WAITING FOR TRANSMISSION | 45 SECONDS |

~103A

CONTENT TRANSMISSION METHOD, CONTENT TRANSMISSION DEVICE, AND RECORDING MEDIUM

CROSS-REFERENCE TO RELATED APPLICATION

This application is based upon and claims the benefit of priority of the prior Japanese Patent Application No. 2014-165149, filed on Aug. 14, 2014, the entire contents of which are incorporated herein by reference.

FIELD

The embodiments discussed herein are related to a content transmission method, a content transmission device, and a recording medium.

BACKGROUND

In recent years, services such as a social networking service (SNS) in which contents are shared between specific users have increased in number. In addition, as a result of contents of high image quality being created based on the advanced functions of terminals, the sizes of shared contents tend to become enlarged and a waiting time taken for upload or download of a content tend to become increased.

As a method for reducing the waiting time taken for upload or download of a content, a method utilizing cache servers has been widely utilized. While being targeted at, for example, contents referenced by many and unspecified users under the control of a cache server, a content whose reference count is high is deployed in the cache server. From this, it is possible for a user under the control of that cache server to reduce a time taken to download a content.

There is proposed, for example, a content distribution system that includes a content server installed on a network and cache servers. In this system, while content data stored in the content server is temporarily stored on the cache servers, the content data is distributed to client terminals. In this system, each cache server sorts processing operations for requests into the content server or another cache server in accordance with the state of the relevant cache server itself, the states of the other cache servers, and the types of request or the amount of requests.

In addition, there is proposed a content providing method that distributes a content reserved to be acquired, to a mobile terminal at a predetermined timing. In this method, a content is stored in a temporary storage unit that satisfies a geographical condition or a temporal condition at the time of distributing the content and the content is distributed to the mobile terminal at a timing that satisfies a temporal condition.

As documents of the related art, there are Japanese Laid-open Patent Publication No. 2006-171822 and Japanese Laid-open Patent Publication No. 2002-49766.

SUMMARY

According to an aspect of the invention, a content transmission method including: searching, when a first information processing device receives a transmission request for a first content from a second information processing device, for a third information processing device within information processing devices, at least one of the information processing devices having a connection with the second information processing device and currently transmitting a second content to the second information processing device; and transmitting to the third information processing device, by the first information processing device, the first content and an instruction to transmit the transmitted first content from the third information processing device to the second information processing device in accordance with the transmission request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a content list;

FIG. 4 illustrates an example of a content location list;

FIG. 6 illustrates an example of a rate list;

FIG. 7 illustrates an example of a setting information table in a first embodiment;

FIG. 8 illustrates an example of a reservation list;

FIG. 9 illustrates an example of a currently-transmitted-content list;

FIG. 24 illustrates an example of a setting information table in a second embodiment;

DESCRIPTION OF EMBODIMENTS

While information processing devices such as a cache server, a content server, and a user terminal each perform communication with other information processing devices after establishing connections therewith, there is an upper limit to the number of connections able to be simultaneously established with the other information processing devices (hereinafter, called "the number of simultaneous connections"). In a case where the number of simultaneous connections has reached the upper limit in an information processing device serving as a transmission destination of a content, it is difficult to establish a new connection between the device itself and the information processing device serving as the transmission destination. Therefore, it is difficult to immediately transmit the relevant content. In this case, after waiting for release of a connection in the information processing device serving as the transmission destination and establishing a connection between the device itself and the information processing device serving as the transmission destination, it is desirable to transmit a content to the information processing device serving as the transmission destination. However, there is a case where it takes time for a connection in the information processing device serving as the transmission destination to be released or a case where the number of simultaneous connections reaches the upper limit in the device itself while waiting for the release.

Since, in the related art, such a problem of the number of simultaneous connections as described above is not taken into consideration, in some cases it is difficult to deploy a content in advance in a cache server to be accessed by a user terminal before the user terminal requests the content.

According to one aspect of a disclosed content transmission method, within the limit of the number of simultaneous connections between information processing devices, it is possible to reduce a time period to completion of transmitting a content to an information processing device that requests the content. Hereinafter, examples of embodiments according to the present technology will be described in detail with reference to drawings.

In the present embodiments, a case where the present technology is applied to a content transmission system in which a content shared and referenced in a group to which users belong is preliminarily deployed in a cache server neighboring a user will be described. More specifically, this is a system in which, before a content request from a user, a content shared in a group to which the user belongs is preliminarily deployed in a cache server that receives group registration (subscription) from the user.

First Embodiment

Figure 1:
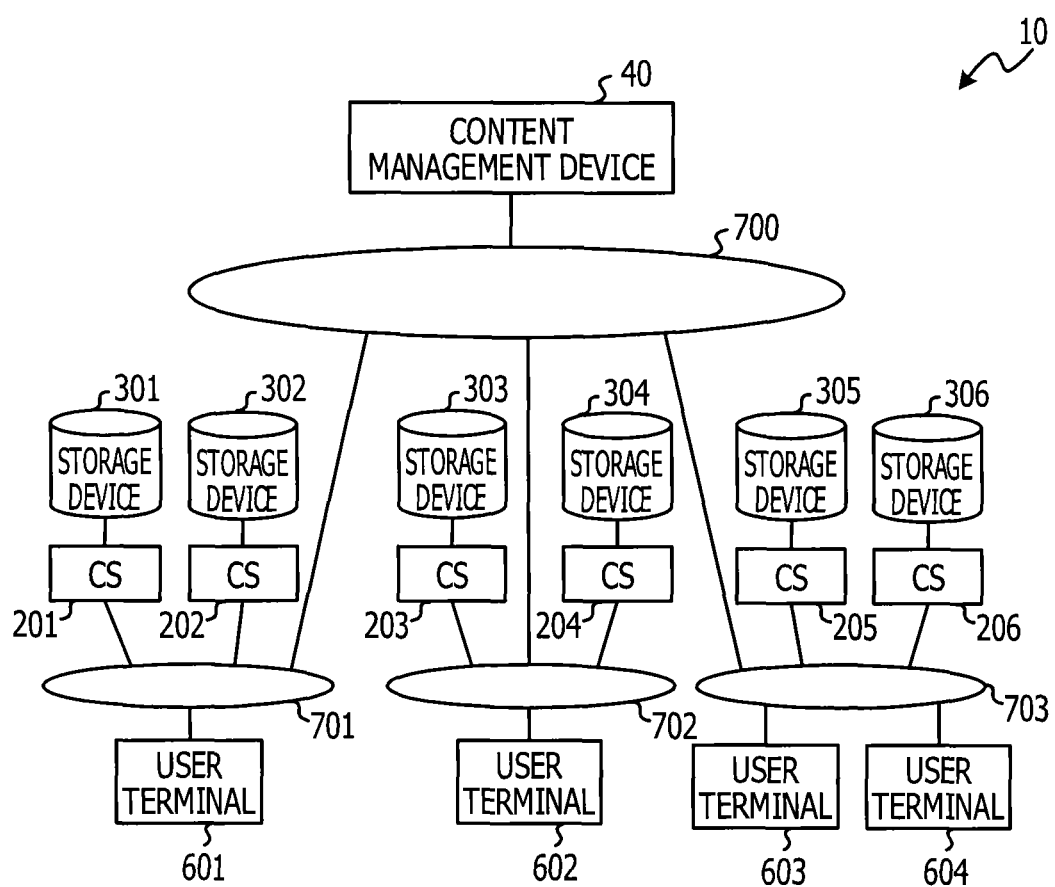
FIG. 1 is a block diagram illustrating a schematic configuration of a content transmission system.

As illustrated in FIG. 1, a content transmission system 10 according to the first embodiment includes a content management device 40, cache servers (CS) 201 to 206, storage devices 301 to 306, and user terminals 601 to 604. The content management device 40 is connected to a wide area network 700. In addition, the wide area network 700 is connected to each of local networks 701, 702, and 703. Note that generally the number of relay devices provided in a wide area network is larger than the number of relay devices provided in a local network. In other words, since, compared with communication within the local network, the number of relay devices through which communication passes becomes large in communication between local networks through the wide area network, a communication cost is large.

In addition, in the example of FIG. 1, the cache servers 201 to 206 are connected to the storage devices 301 to 306, respectively, on a one-to-one basis. In addition, the cache servers 201 and 202 are connected to the local network 701, the cache servers 203 and 204 are connected to the local network 702, and the cache servers 205 and 206 are connected to the local network 703.

Note that since the individual configurations of the cache servers 201 to 206 are equal to one another, hereinafter the cache servers 201 to 206 will be each expressed as "cache server 20$n$" in a case of being described while not being discriminated from one another. In addition, since the individual configurations of the storage devices 301 to 306 are equal to one another, hereinafter the storage devices 301 to 306 will be each expressed as "storage device 30$n$" in a case of being described while not being discriminated from one another.

In addition, in the example of FIG. 1, the user terminal 601 is connected to the local network 701, the user terminal 602 is connected to the local network 702, and the user terminals 603 and 604 are connected to the local network 703. In this regard, however, each of the user terminals 601 to 604 is a portable terminal such as a mobile phone, a smartphone, a tablet terminal, or a notebook-size personal computer and is connectable to all of the local networks 701, 702, and 703. Hereinafter, the user terminals 601 to 604 will be each expressed as "user terminal 60$n$" in a case of being described while not being discriminated from one another.

Note that a network configuration of the content transmission system 10 is not limited to the example of FIG. 1. In addition, the number of cache servers 20$n$, the number of storage devices 30$n$, or the number of user terminals 60$n$, included in the content transmission system 10, is not limited to the example of FIG. 1.

Figure 2:
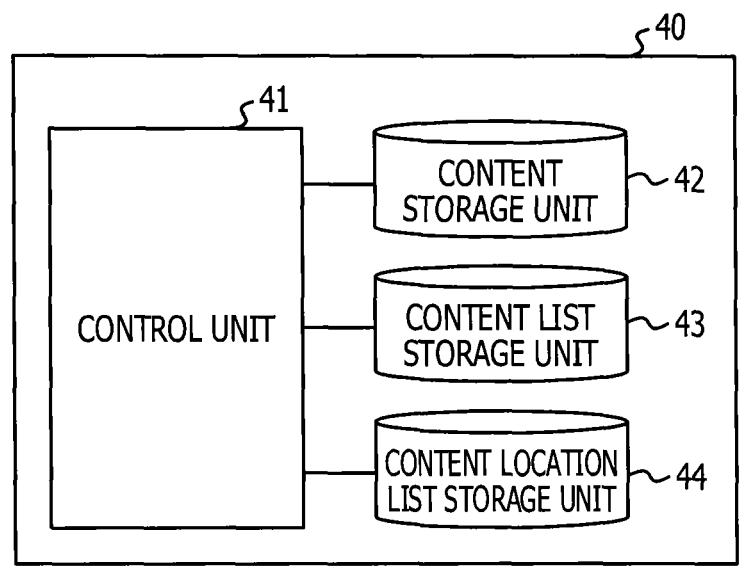
FIG. 2 is a block diagram illustrating a schematic configuration of a content management device.

As illustrated in FIG. 2, the content management device 40 includes a control unit 41, a content storage unit 42, a content list storage unit 43, and a content location list storage unit 44.

Contents to be distributed to users are stored in the content storage unit 42. Examples of the contents include image data, video data, music data, text data, and so forth.

Based on the history of a content previously referenced by a user, the control unit 41 extracts a group of a user who shares and references the same content. In addition, the control unit 41 defines a content shared and referenced by a user belonging to each group, as a shared content in the relevant group, and creates a content list that registers therein information of the shared content for each group.

FIG. 3 illustrates an example of a content list 100. In the example of FIG. 3, for each group, a group ID serving as identification information of the relevant group, a content ID serving as identification information of a shared content of the relevant group, and the size of the shared content are associated with one another. In other words, an entry of <Gr1,abc,50 Mb> in the content list 100 illustrated in FIG. 3 indicates a meaning that "a group of a group ID=Gr1 shares and references a content of content ID=abc, whose file size is 50 Mb". The control unit 41 stores the created content list 100 in the content list storage unit 43 and distributes the created content list 100 to each cache server 20$n$. Note that hereinafter a group of a group ID=Gr$n$ is expressed as "group $n$" and a content of a content ID=$n$ is expressed as "content $n$".

In addition, the control unit 41 deploys, in one of the cache servers 20n, each of the contents stored in the content storage unit 42. One content may be deployed in one cache server or may be deployed in two or more cache servers. Here, deployment of a content in the cache server 20n means storing a content in the content storage unit 36 (the details thereof will be described later) in the storage device 30n corresponding to the cache server 20n.

In addition, the control unit 41 creates a content location list indicating which content is deployed in which cache server 20n, in other words, a location of each content. FIG. 4 illustrates an example of a content location list 101. In the example of FIG. 4, a content ID of a content and a cache server ID (CS-ID) serving as identification information of a cache server in which the relevant content is deployed are associated with each other. The content location list 101 illustrated in FIG. 4 includes, for example, an entry of <abc,CS201>. This means that "a content abc is held in the cache server 201". The control unit 41 stores the created content location list 101 in the content location list storage unit 44. Note that, in the present embodiment, the CS-ID of the cache server 20n is defined as "CS20n".

In addition, in a case where a change in a deployment state of a content in each cache server 20n occurs based on processing described later, the control unit 41 acquires the information thereof from each cache server 20n. In addition, based on the acquired information, the control unit 41 updates the content location list 101 stored in the content location list storage unit 44.

Figure 5:
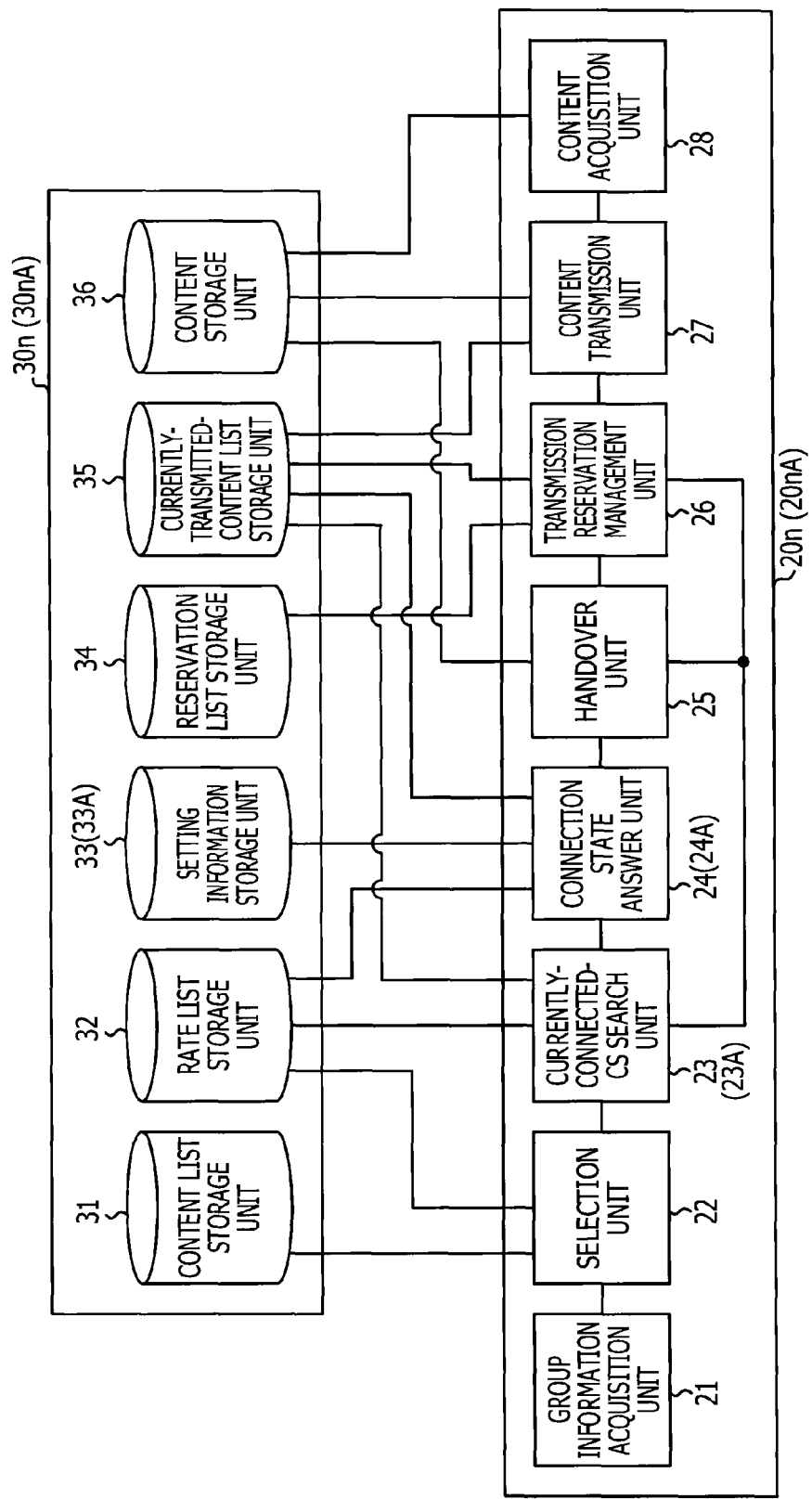
FIG. 5 is a block diagram illustrating a schematic configuration of a cache server.

Next, the cache server 20n and the storage device 30n will be described in detail. As illustrated in FIG. 5, the storage devices 30n each include a content list storage unit 31, a rate list storage unit 32, a setting information storage unit 33, a reservation list storage unit 34, a currently-transmitted-content list storage unit 35, and a content storage unit 36.

In the content list storage unit 31, the content list 100 (for example, in FIG. 3) distributed from the content management device 40 is stored.

In the rate list storage unit 32, a rate list indicating a communication state between the cache server 20n corresponding to the relevant storage device 30n and each of the other cache servers 20n. As an example, FIG. 6 illustrates a rate list 102 stored in the rate list storage unit 32 in the cache server 205. In the example of FIG. 6, the CS-IDs of the other cache servers 20n and throughputs (Mbps) indicating data traffics per unit time with the other cache servers 20n are associated with each other. Furthermore, the number of hops indicating the number of relay devices with each of the other cache servers 20n is associated with the rate list 102. In other words, an entry of <CS201,2 Mbps,7> in the rate list 102 held by the cache server 205 and illustrated in FIG. 6 indicates a meaning that "the throughput between the cache server 205 and the cache server 201 is 2 Mbps and the number of hops is 7".

In the rate list 102, entries whose number is equivalent to the number of the other cache servers 20n are registered. In addition, the values of the throughputs registered in the rate list 102 are throughputs viewed from the cache server 20n that holds the relevant rate list 102 and the values of the rate lists 102 held by the respective cache servers 20n vary depending on the cache servers 20n. Note that the rate list 102 held by the corresponding cache server 20n is the rate list 102 stored in the rate list storage unit 32 in the storage device 30n corresponding to the relevant cache server 20n.

In the setting information storage unit 33, setting information relating to content transmission processing performed in the cache server 20n. Such a setting information table 103 as illustrated in, for example, FIG. 7, in which an upper limit value of the number of simultaneous connections and an upper limit time of preliminary deployment are defined, is stored. The details of individual parameters will be described later.

In response to transmission requests for contents (the details thereof will be described later) received from the other cache servers 20n, a reservation list, in which entries indicating contents scheduled to be transmitted are registered, is stored in the reservation list storage unit 34. FIG. 8 illustrates an example of a reservation list 104. In the example of FIG. 8, the CS-ID of the cache server 20n serving as a transmission request source, the content ID of a content to be transmitted, the size of the content, and start time are associated with one another. In other words, an entry of <CS205,def,30> in the reservation list 104 in FIG. 8 indicates a meaning that "a content def whose size is 30 Mb is scheduled to be transmitted to the cache server 205". Note that the "start time" is an item in which time when it is possible to start transmission in a case of, for example, transmitting a content after waiting for a predetermined time period, and in a case of immediately transmitting a content, time does not have to be registered in the item of the "start time".

In the currently-transmitted-content list storage unit 35, a currently-transmitted-content list, in which an entry indicating a currently transmitted content is registered, is stored. FIG. 9 illustrates an example of a currently-transmitted-content list 105. In the example of FIG. 9, the CS-ID of the cache server 20n serving as a transmission request source, the content ID of a currently transmitted content, and a remaining data size before transmission completion of the content are associated with one another. In other words, an entry of <CS205,abc,20> in the currently-transmitted-content list 105 in FIG. 9 indicates a meaning that "the content abc is currently transmitted to the cache server 205 and the remaining data size before the transmission completion is 20 Mb".

In the content storage unit 36, contents acquired from the content management device 40 or the other cache servers 20n are stored.

The cache servers 20n each include a group information acquisition unit 21, a selection unit 22, a currently-connected-CS search unit 23, a connection state answer unit 24, a handover unit 25, a transmission reservation management unit 26, a content transmission unit 27, and a content acquisition unit 28.

The group information acquisition unit 21 acquires group information from the corresponding user terminal 60n brought under the control of the device itself. As illustrated in, for example, FIG. 10, in accordance with the physical locations of the cache servers 20n, areas handled by the respective cache servers 20n are defined. In addition, in the area of one cache server 20n, by a user operating the corresponding user terminal 60n, the corresponding user terminal 60n performs group registration (subscription) on the cache server 20n corresponding to the area. The cache server 20n corresponding to the area is a neighboring cache server for the corresponding user terminal 60n. In a case where, for example, a targeted application is activated in the corresponding user terminal 60n, a message including the group information of a group to which the user belongs is transmitted to the neighboring cache server, thereby enabling the group registration to be performed. A state in which the corresponding user terminal 60n is registered in the neighboring cache server means that the corresponding user terminal 60n is brought under the control of the relevant cache server 20n.

Figure 10:
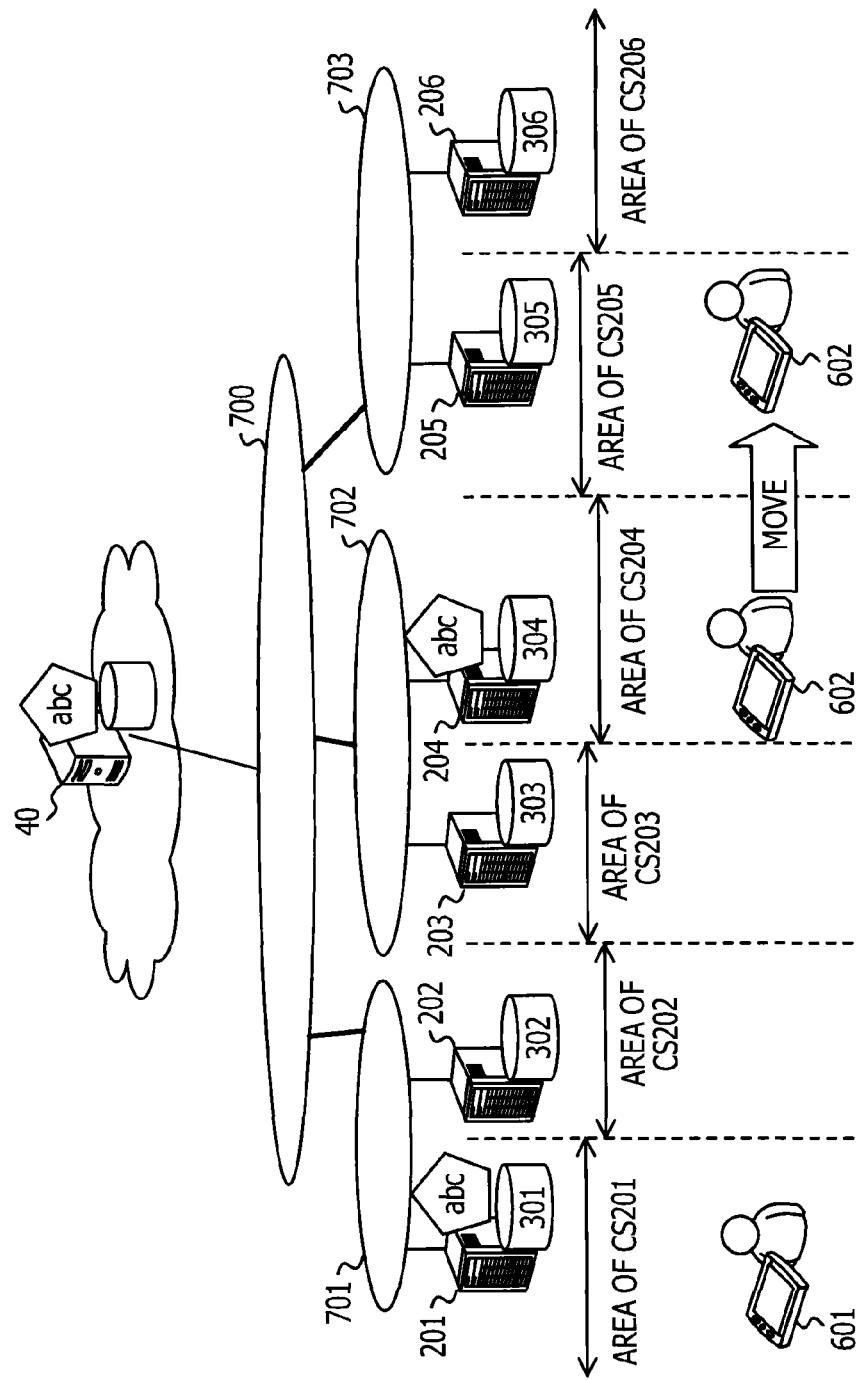
FIG. 10 is a diagram for explaining group registration.

In the example of, for example, FIG. 10, the user terminal 601 operated in the area of the cache server 201 is brought under the control of the cache server 201. In addition, there is a case where the user terminal 602 brought under the control of the cache server 204 moves, thereby entering the area of the cache server 205. In this case, the user terminal 602 moves away from the control of the cache server 204 and is brought under the control of the cache server 205.

Here, a system in which the group information transmitted from the corresponding user terminal 60n is transmitted to a neighboring cache server will be described. For example, a domain name service (DNS) query, usually performed by an application (hereinafter, called a "terminal application") activated in the corresponding user terminal 60n, may be used. Usually the terminal application makes a DNS query using, as a key, a connection destination URL preliminarily set in the terminal application, obtains the IP address of a connection destination, and transmits a message addressed to the IP address.

Figure 11:
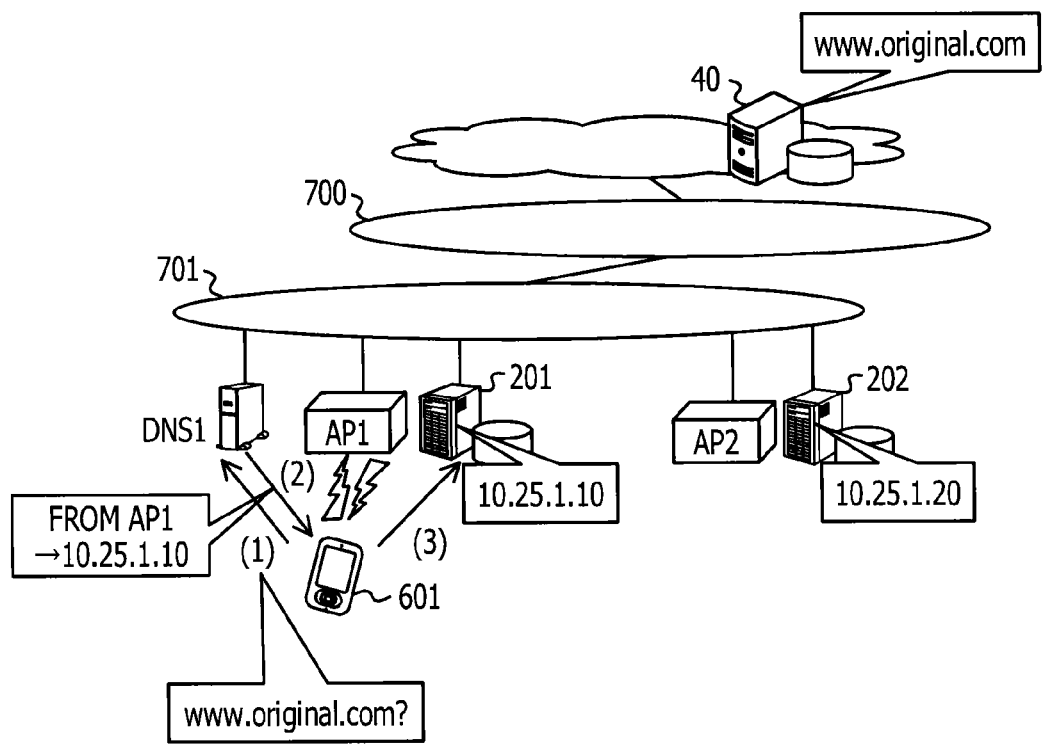
FIG. 11 is a diagram for explaining the group registration.

As illustrated in, for example, FIG. 11, at the time of the group registration, first the user terminal 601 sends a query to a DNS server using, as a key, the URL of the content management device 40 ((1) in FIG. 11). In the DNS server, an access point (AP) and the IP address of a cache server located near the AP are associated with each other. In addition, the DNS server feeds back the IP address, (10.25.1.10), of the cache server 201 located near the connected AP of the user terminal 601 ((2) in FIG. 11). From this, the group registration is performed on the neighboring cache server 201 of the user terminal 601 ((3) In FIG. 11).

Note that, as a method used by the DNS server to understand the connected AP of a user terminal, the range of, for example, an IP address to be assigned to the user terminal is decided for each connected AP, thereby knowing the corresponding connected AP from a transmission source IP address.

In addition, in a case of moving in such a manner as the user terminal 602 illustrated in FIG. 10, it is desirable to perform the group registration on a new neighboring cache server in a state of already activating the terminal application. As this method, using the terminal application, for example, the ID of the connected AP (a base station ID or a wireless basic service set ID (BSSID: usually the MAC address of the connected AP) is monitored. In addition, at the time of changing the ID of the connected AP, the group information is transmitted to the neighboring cache server.

Note that while, in the present embodiment, a case where the group information acquisition unit 21 receives, as the group information, a message including a group ID serving as the identification information of a group from the corresponding user terminal 60n will be described, the present embodiment is not limited to this. The group information acquisition unit 21 may receive, for example, the identification information (for example, a user ID) of a user. In this case, the group information acquisition unit 21 may preliminarily hold a correspondence list between the identification information of a user and group information and may acquire the group information of the user from the received identification information of the user and this correspondence list.

Based on the group ID acquired by the group information acquisition unit 21, the selection unit 22 determines whether or not a content shared in a group indicated by that group ID is deployed in the device itself. In a case of not being deployed in the device itself, the selection unit 22 selects which of the other cache servers 20n a content is to be acquired from. The selection unit 22 selects one of the cache servers 20n cable of completing acquisition of the content as soon as possible.

Specifically, first the selection unit 22 references the content list 100 stored in the content list storage unit 31 and acquires the content ID of a shared content corresponding to the group ID acquired by the group information acquisition unit 21. As illustrated in, for example, FIG. 12, it is assumed that, based on the group registration from the user terminal 602 to the cache server 205, a group ID=Gr1 is acquired by the group information acquisition unit 21 in the cache server 205 ((1) in FIG. 12). From the content list 100 stored in the content list storage unit 31 and illustrated in, for example, FIG. 3, the selection unit 22 in the cache server 205 acquires the content ID=abc and the size=50 Mb of the content using the group ID=Gr1 as a key.

Figure 12:
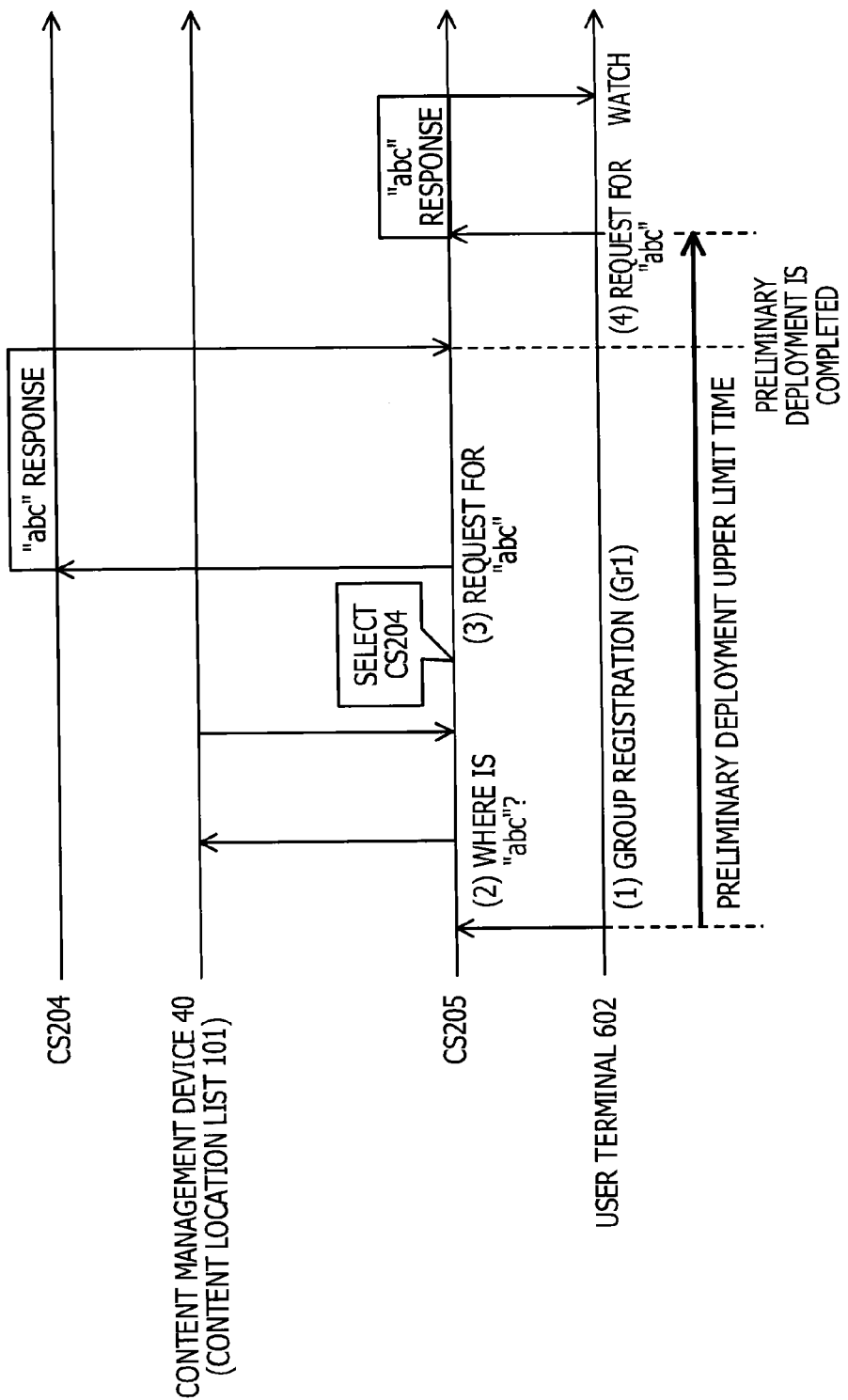
FIG. 12 is a diagram for explaining selection of a cache server to acquire a content.

In addition, using the acquired content ID as a key, the selection unit 22 sends a query to the content management device 40 about the location of the content of that content ID ((2) in FIG. 12). In the content management device 40, the content location list 101 stored in the content location list storage unit 44 is referenced and the location of the content is fed back to the corresponding cache server 20n. It is assumed that the content management device 40 takes a query about the location of, for example, the content abc from the cache server 205. Based on the content location list 101 illustrated in, for example, FIG. 4, the content management device 40 transmits, as the location of the content abc, the CS-ID=CS201 of the cache server 201 and the CS-ID=CS204 of the cache server 204 to the cache server 205.

The selection unit 22 acquires the locations of the content transmitted from the content management device 40. For each of the acquired locations of the content, in other words, each cache server 20n in which the shared content is deployed, the selection unit 22 calculates estimated acquisition completion time in a case where the content is acquired from the relevant cache server 20n.

Specifically, using the acquired CS-IDs as keys, the selection unit 22 acquires, from the rate list 102, throughputs between the respective cache servers 20n serving as the locations of the content and the device itself. In addition, based on the size of the content acquired from the content list 100 and throughputs with the respective cache servers 20n, the selection unit 22 calculates an acquisition time taken in a case where the corresponding content is acquired from each of the cache servers 20n. In addition, the selection unit 22 defines time expressed by current time+the acquisition time, as the corresponding estimated acquisition completion time.

From the rate list 102 illustrated in, for example, FIG. 6, a throughput=2 Mbps with the cache server 201 and a throughput=5 Mbps with the cache server 204 are acquired. Since the size of the content abc is 50 Mb, the acquisition time with the cache server 201 is 25 seconds and the acquisition time with the cache server 204 is 10 seconds. Accordingly, if the current time is 11:20:15, the estimated acquisition completion time with the cache server 201 is 11:20:40 25 seconds after 11:20:15 and the estimated acquisition completion time with the cache server 204 is 11:20:25 10 seconds after 11:20:15.

As illustrated in FIG. 12, before a request for a content, issued from the user terminal 60n ((4) in FIG. 12) after activation of a terminal application ((1) in FIG. 12), it is desirable to preliminarily deploy the content in the neighboring cache server 20*n* of the user terminal 60*n*. In other words, a time period from activation of the terminal application to the request for a content issued from the user terminal 60*n* is the upper limit time for the preliminary deployment. Therefore, from among the cache servers 201 and 204 that each currently hold the shared content, the cache server 204 is selected so that the content is acquired from the cache server 204 whose estimated acquisition completion time is earlier ((3) in FIG. 12). Note that the upper limit time of the preliminary deployment may be defined, as a parameter, in the above-mentioned setting information table 103.

In addition, the selection unit 22 transmits, to the selected cache server 20*n*, a transmission request for the content, in which the content ID of the content intended to be acquired is specified.

Here, the cache server 20*n* that receives the transmission request for the content transmits the requested content to the cache server 20*n* serving as a transmission request source. However, at this time, there is the following problem.

Figure 13:
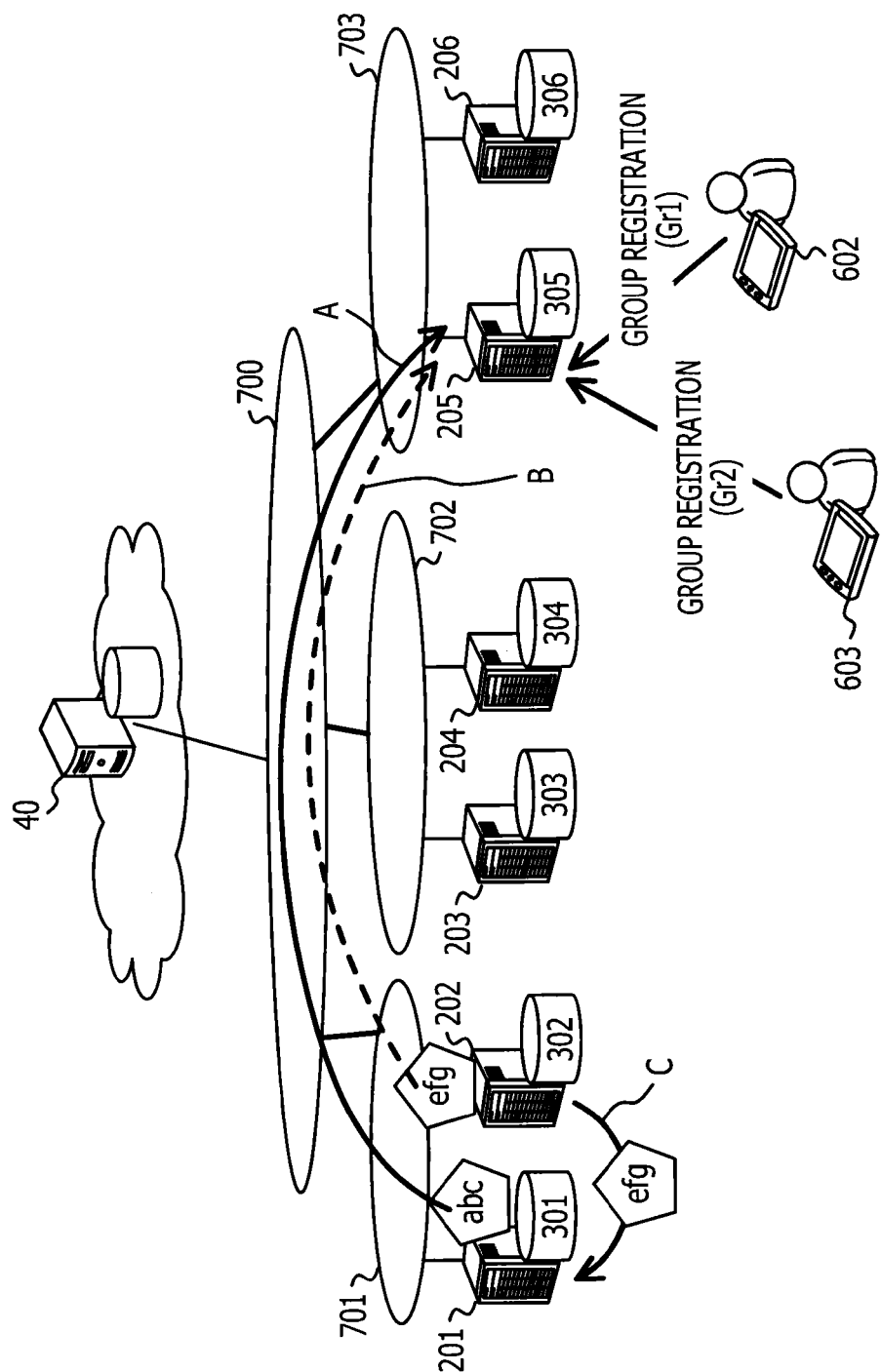
FIG. 13 is a diagram for explaining transmission of a content under a limit of the number of simultaneous connections.

As illustrated in, for example, FIG. 13, it is assumed that immediately after group registration is performed on the cache server 205 by the user terminal 602 belonging to a group 1, group registration is performed by the user terminal 603 belonging to a group 2. In this case, contents shared in the respective groups 1 and 2 are preliminarily deployed in the cache server 205. It is assumed that a content shared in the group 1 is the content abc and a content shared in the group 2 is a content efg. In addition, it is assumed that the content abc is held in the cache server 201 and the content efg is held in the cache server 202.

First, in response to the group registration from the user terminal 602, performed first, a communication connection is established between the cache server 205 and the cache server 201 and the content abc is transmitted from the cache server 201 to the cache server 205 (A in FIG. 13). Next, in a state in which the cache server 201 and the cache server 205 are currently connected to each other, in response to the group registration from the user terminal 603, performed immediately thereafter, a communication connection is established between the cache server 205 and the cache server 202. In addition, the content efg is transmitted from the cache server 202 to the cache server 205 (B in FIG. 13).

Figure 14:
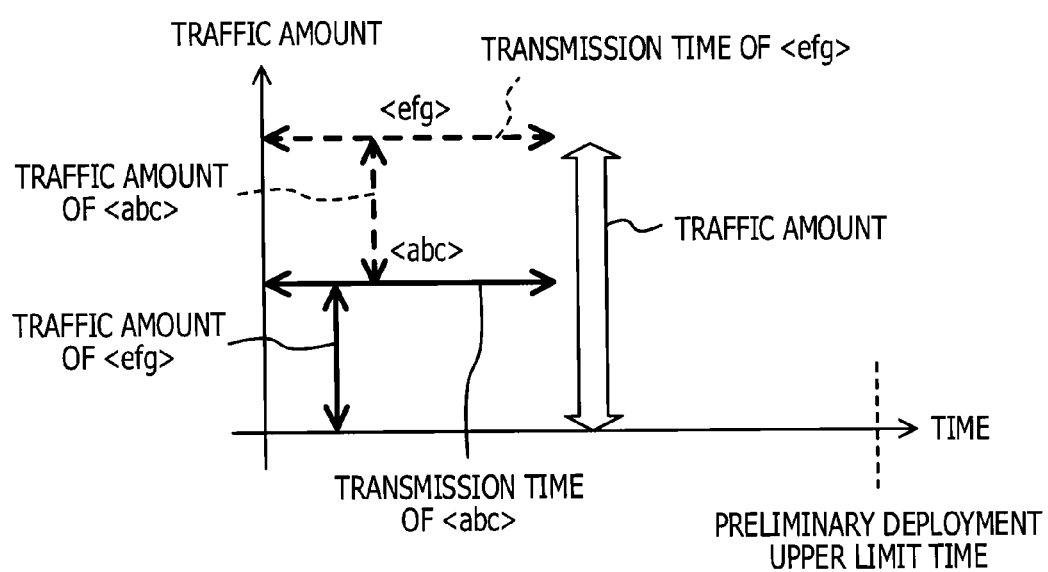
FIG. 14 is a diagram for explaining transmission of a content under a limit of the number of simultaneous connections.

In this case, as illustrated in FIG. 14, two or more contents (here two contents) are simultaneously sent to a network. Therefore, the traffic amount of the network increases. In particular, as illustrated in FIG. 13, in a case of communication between different local networks, a traffic amount in the wide area network 700 increases. In order to deal with requests of many users, it is desirable to suppress an increase in the traffic amount. Therefore, in a case where another cache server that currently transmits a content to the same transmission destination exists, if transmission of a content from the device itself is started after waiting for completion of that transmission, it is possible to suppress an increase in the traffic amount, compared with a case of simultaneously transmitting contents.

However, in each cache server, the upper limit value of the number of simultaneous connections is set. The number of simultaneous connections is provided for avoiding an increase in the load of a cache server, a user terminal, or the like. There is the upper limit of a throughput of, for example, one TCP connection and the upper limit thereof is lower than the bandwidth width of a physical link. Therefore, a measure to secure a total throughput using two or more TCP connections is taken. In this regard, however, even if the number of connections is increased, it is difficult for a throughput to be increased to be greater than or equal to the bandwidth width of the physical link and furthermore, connection management has costs such as memory consumption and a CPU load. Therefore, the upper limit value of the number of simultaneous connections is provided.

Figure 15:
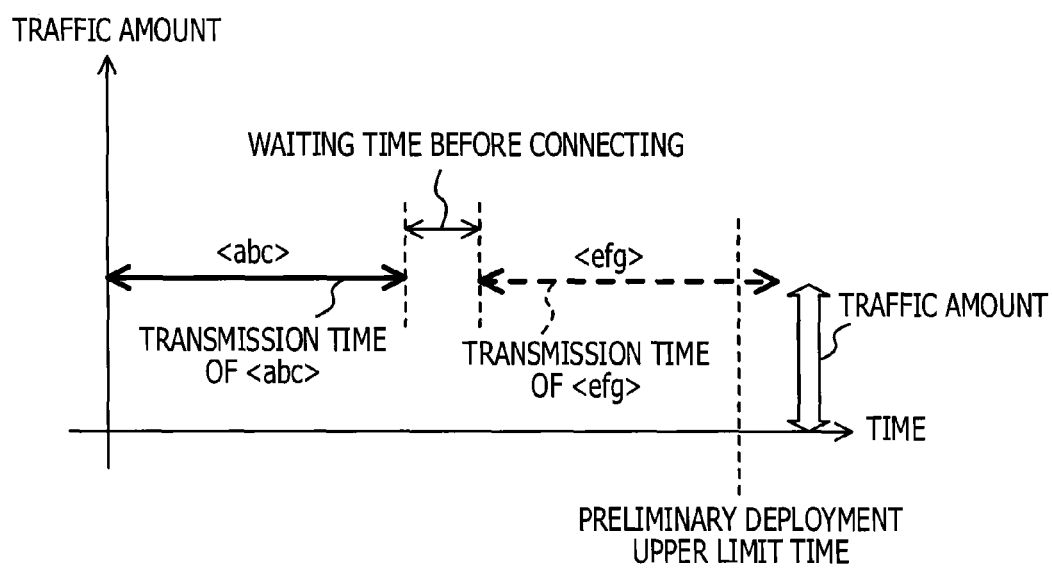
FIG. 15 is a diagram for explaining transmission of a content under a limit of the number of simultaneous connections.

As described above, the upper limit value of the number of simultaneous connections is provided for each cache server. Therefore, in some cases, while waiting for transmission completion of a content from another cache server, a connection is established in order for the device itself to, for example, deal with another transmission request and so forth and the number of simultaneous connections reaches the upper limit thereof. More specifically, in the example of FIG. 13, it is assumed that, after waiting for completion of transmission of the content abc from the cache server 201 to the cache server 205, the content efg is to be transmitted from the cache server 202 to the cache server 205. In a case where a connection state between the cache server 202 and other cache servers or the like reaches the upper limit value of the number of simultaneous connections at the time of the completion of transmission of the content abc from the cache server 201, it is difficult to transmit the content efg to the cache server 205. In this case, after waiting until one connection in the cache server 202 is released and the number of simultaneous connections becomes less than the upper limit value, a connection with the cache server 205 is established and the content efg is transmitted. In a case where a waiting time period before the number of simultaneous connections becomes less than the upper limit value is long, in some cases it is difficult to deploy the content efg in the cache server 205 within the above-mentioned preliminary deployment upper limit time, as illustrated in FIG. 15.

Figure 16:
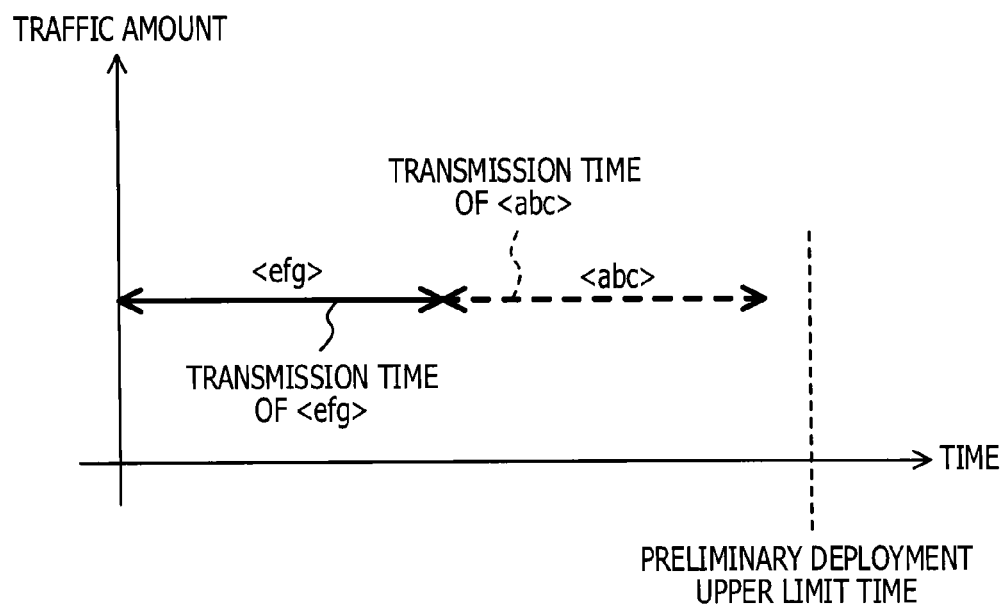
FIG. 16 is a diagram for explaining transmission of a content under a limit of the number of simultaneous connections.

Therefore, in the present embodiment, transmission of a content is handed over to the corresponding cache server 20*n* that has already held a connection with the cache server 20*n* serving as the transmission request source. From this, from the corresponding cache server 20*n* that has already been connected to the cache server 20*n* serving as the transmission request source, contents are sequentially transmitted to the cache server 20*n* serving as the transmission request source. Therefore, as illustrated in FIG. 16, it is possible to suppress an increase in the traffic amount of the network and it is possible to transmit contents with no waiting time. Hereinafter, a functional unit that handles the above-mentioned processing will be described in detail.

Upon receiving a transmission request for a content, transmitted from another cache server 20*n*, the currently-connected-CS search unit 23 references the currently-transmitted-content list 105 and determines whether or not the device itself is currently connected to the cache server 20*n* serving as a transmission request source. In a case where an entry including, for example, the CS-ID of the cache server 20*n* serving as the transmission request source exists in the currently-transmitted-content list 105, it is possible to determine as being currently connected. In a case of being currently connected, the currently-connected-CS search unit 23 decides to transmit the content from the device itself to the cache server 20*n* serving as the transmission request source. In this case, the currently-connected-CS search unit 23 notifies the transmission reservation management unit 26 of information including the CS-ID of the cache server 20*n* serving as the transmission request source, a content ID specified by the transmission request, and the size of a content indicated by that content ID. Note that the size of the content is acquired from the content list 100.

In a case where the device itself is not currently connected to the cache server 20n serving as the transmission request source, the currently-connected-CS search unit 23 searches for the surrounding cache server 20n currently connected to the cache server 20n serving as the transmission request source. Specifically, the currently-connected-CS search unit 23 transmits a query to the cache server 20n surrounding the device itself about whether being currently connected to the cache server 20n serving as the transmission request source or nor and in a case of being currently connected thereto, the currently-connected-CS search unit 23 transmits a query thereto about a connection state including estimated release time of that connection. In addition, in the query about the connection state, the CS-ID of the cache server 20n serving as the transmission request source is specified. By referencing, for example, the rate list 102, the cache server 20n in which the number of hops with the device itself is less than or equal to a predetermined number may be set as the cache server 20n surrounding the device itself. In addition, the corresponding cache server 20n connected to the same local network as a local network to which the device itself is connected may be set as the surrounding cache server 20n.

In addition, the currently-connected-CS search unit 23 receives, from the surrounding cache server 20n, an answer to the query about the connection state. Based on the received answer about the connection state, the currently-connected-CS search unit 23 determines whether or not it is possible to complete transmission of a content to the surrounding cache server 20n before the estimated release time of a connection in the surrounding cache server 20n that transmitted the answer. Specifically, a throughput with the surrounding cache server 20n that transmitted the answer is acquired from the rate list 102 and a time period obtained by dividing the size of a content to be transmitted by the acquired throughput is added to current time, thereby calculating estimated transmission completion time. In addition, in a case where the estimated transmission completion time is earlier than the estimated release time, it is possible to determine that it is possible to complete transmission of a content to the surrounding cache server 20n that transmitted the answer before the estimated release time. In a case where it is possible to complete transmission before the estimated release time, the currently-connected-CS search unit 23 decides that cache server 20n as a handover destination cache server 20n and gives notice to the handover unit 25.

In addition, in a case of receiving answers about connection states from two or more cache servers 20n, the currently-connected-CS search unit 23 calculates estimated transmission completion time for each of the surrounding cache servers 20n that transmitted the answers. Furthermore, in a case where two or more cache servers 20n each capable of completing transmission of a content before corresponding estimated release time exist, the currently-connected-CS search unit 23 preferentially decides the corresponding cache server 20n whose estimated transmission completion time is earlier, as the cache server 20n to serve as a handover destination. From this, it is possible to preliminarily deploy a content sooner in the cache server 20n serving as the transmission request source.

In addition, in a case of receiving no answer about the connection state from the surrounding cache server 20n, the currently-connected-CS search unit 23 decides to transmit a content from the device itself to the cache server 20n serving as the transmission request source. In this case, the currently-connected-CS search unit 23 notifies the transmission reservation management unit 26 of information including the CS-ID of the cache server 20n serving as the transmission request source, the content ID specified by the transmission request, and the size of the content indicated by that content ID. Note that the size of the content is acquired from the content list 100. In addition, in a case where no cache server 20n capable of completing transmission of a content before the estimated release time exists, the currently-connected-CS search unit 23 decides to transmit a content from the device itself to the cache server 20n serving as the transmission request source. In this case, the transmission reservation management unit 26 is notified of information to which estimated release time included in a received answer about a connection state is added along with the CS-ID, the content ID, and information of the content ID.

Upon receiving a query about a connection state, transmitted from another cache server 20n, the connection state answer unit 24 determines whether being currently connected to the cache server 20n serving as a transmission request source, specified by the query, and the number of simultaneous connections is less than an upper limit value or not. Specifically, in a case where an entry including a CS-ID indicating the cache server 20n serving as the transmission request source exists in the currently-transmitted-content list 105, the connection state answer unit 24 determines as being currently connected to the cache server 20n serving as the transmission request source. In addition, the connection state answer unit 24 obtains the current number of simultaneous connections by counting the number of entries in the currently-transmitted-content list 105 and determines whether or not the number of simultaneous connections is less than a preliminarily defined upper limit value, by comparing the current number of simultaneous connections with the predetermined upper limit value. In a case where being currently connected to the cache server 20n serving as the transmission request source and the number of simultaneous connections is less than the upper limit value, the connection state answer unit 24 calculates the estimated release time of that connection.

It is assumed that the connection state answer unit 24 in the cache server 201 receives a query about a connection state, which specifies, for example, the CS-ID=CS205. The connection state answer unit 24 counts the number of entries in such a currently-transmitted-content list 105 as illustrated in, for example, FIG. 9, obtains the current number of simultaneous connections, "1", and compares the current number of simultaneous connections with the upper limit value of the number of simultaneous connections, defined in the setting information table 103. In a case of being less than the upper limit value of the number of simultaneous connections, entries including the CS-ID=CS205 are searched for within the currently-transmitted-content list 105 illustrated in, for example, FIG. 9. Here, since the relevant entry exists, it is determined that the device itself is currently connected to the cache server 205 serving as the transmission request source. In addition, it is assumed that a throughput of, for example, "5 Mbps" with the cache server 205 is acquired from the rate list 102. In addition, from the "remaining size" of the relevant entry in the currently-transmitted-content list 105 illustrated in FIG. 9, "20 Mb" is acquired. Furthermore, it is assumed that current time is "11:20:20". In this case, the estimated release time=the current time+(the remaining size/the throughput)="11:20:20"+(20 Mb/5 Mbps)="11:20:24" is calculated.

In a case of determining as being currently connected to the cache server 20n serving as the transmission request source, the connection state answer unit 24 provides, to the query source, an answer to the effect of being currently connected to the cache server 20*n* serving as the transmission request source, the answer including the estimated release time. Such an answer as, for example, "the connection state=being currently connected to the cache server 20*n*, the estimated release time=HH:MM:SS" is transmitted. In a case of not being currently connected to the cache server 20*n* serving as the transmission request source, the connection state answer unit 24 provides no answer about the connection state. Note that, in a case where the number of simultaneous connections reaches the upper limit value, not being in a state capable of receiving a transmission handover request for a content (described later in detail) is determined and not being currently connected to the cache server 20*n* serving as the transmission request source is assumed.

The handover unit 25 hands over transmission of a content serving as a transmission target to be transmitted to the cache server 20*n* serving as the transmission request source, to the cache server 20*n* that serves as a handover destination and is given notice of by the currently-connected-CS search unit 23. Specifically, the handover unit 25 acquires, from the content storage unit 36, a content serving as a transmission target. In addition, the handover unit 25 transmits, to the cache server 20*n* serving as the handover destination, the content acquired from the content storage unit 36, along with a transmission handover request specifying the CS-ID of the cache server 20*n* serving as the transmission request source and the content ID of the content the transmission of which is to be handed over.

In addition, the handover unit 25 gives a notice to the cache server 20*n* serving as the transmission request source to the effect that the transmission of the content is handed over to the cache server 20*n* serving as the handover destination. The content of the notice may be set to, for example, "the content ID=edf,handover destination=CS205".

Upon receiving a notice from the currently-connected-CS search unit 23, which indicates that the device itself is currently connected to the cache server 20*n* serving as the transmission request source, the transmission reservation management unit 26 adds an entry based on the notice to the reservation list 104. The entry at this time includes a CS-ID, a content ID, and the size of a content, included in the notice. In the same way, at the time of receiving a handover request, the transmission reservation management unit 26 adds, to the reservation list 104, an entry including information of a CS-ID, a content ID, and the size of a content, included in the handover request.

In addition, the transmission reservation management unit 26 receives a notice from the currently-connected-CS search unit 23, which indicates that a content is to be transmitted from the device itself to the cache server 20*n* serving as the transmission request source because it is difficult to search for the cache server 20*n* to serve as a handover destination. In a case of receiving this notice, an entry according to a state of the number of simultaneous connections of the device itself is added to the reservation list 104. Specifically, in a case where the number of simultaneous connections is less than the upper limit value, an entry is added, the entry indicating that the content is to be transmitted from the device itself to the cache server 20*n* serving as the transmission request source after waiting for release of a connection between another cache server 20*n* and the cache server 20*n* serving as the transmission request source. More specifically, an entry, to which information of estimated release time included in the notice is added as "start time" along with information of a CS-ID, a content ID, and the size of a content, included in the notice, is added to the reservation list 104. In a case the number of simultaneous connections reaches the upper limit value, the information of the "start time" is not included in the entry added to the reservation list 104.

To transmit a content from the device itself to the cache server 20*n* serving as the transmission request source after waiting until the estimated release time achieves suppression of the traffic amount of the network in the same way as in a case of sending a handover request for a content to another cache server 20*n*. In this regard, however, unlike in a case of handing over to another cache server 20*n*, there is a possibility that the number of simultaneous connections of the device itself or the cache server 20*n* serving as the transmission request source reaches the upper limit value at the estimated release time and it is difficult to transmit a content. Therefore, in a case of performing transmission after waiting until the estimated release time, a case of having leeway in the number of connections (a case where the number of simultaneous connections is less than the upper limit value) is set as a condition in order to avoid a state in which the number of simultaneous connections reaches the upper limit value and it is difficult to transmit a content. On the other hand, in a case of having no leeway in the number of connections (a case where the number of simultaneous connections reaches the upper limit value), without taking into consideration the estimated release time, a content is allowed to be immediately transmitted in a case of being put into a state of being able to transmit the content to the cache server 20*n* serving as the transmission request source. This puts into a state of being able to respond to a transmission request for a content in processing as instantaneously as possible and process another transmission request from another cache server 20*n*.

In addition, the transmission reservation management unit 26 monitors the "remaining size" of the currently-transmitted-content list 105 and in a case where the remaining size becomes "0", the transmission reservation management unit 26 determines that transmission of a content indicated by that entry is completed, and deletes that entry from the currently-transmitted-content list 105. In addition, within the reservation list 104, the transmission reservation management unit 26 searches for an entry including the same CS-ID as the CS-ID of the entry to be deleted. In a case where the relevant entry exists, the transmission reservation management unit 26 moves the relevant entry in the reservation list 104 to the currently-transmitted-content list 105 while maintaining a connection between the cache server 20*n* indicated by that CS-ID and the device itself. In a case where the relevant entry is not searched for within the reservation list 104, a connection between the cache server 20*n* indicated by that CS-ID and the device itself is released.

The content transmission unit 27 acquires, from the content storage unit 36, a content indicated by a content ID included in an entry registered in the currently-transmitted-content list 105. In addition, the content transmission unit 27 confirms the presence or absence of a connection with the cache server 20*n* indicated by a CS-ID included in the entry registered in the currently-transmitted-content list 105. In a case of not being connected, the content acquired from the content storage unit 36 is transmitted after a connection is established. In a case where it is difficult to establish a connection, a retry is performed at predetermined time intervals. In addition, the content transmission unit 27 acquires a remaining data size before transmission completion of a currently transmitted content and updates the "remaining size" in the currently-transmitted-content list 105.

The content acquisition unit 28 acquires a content transmitted from another cache server 20n and stores the content in the content storage unit 36. In addition, when the acquisition of the content is completed, the content acquisition unit 28 notifies the content management device 40 that the content is deployed in the device itself. The content acquisition unit 28 transmits, to the content management device 40, for example, information <abc,CS5> including the content ID of the content the acquisition of which is completed and the CS-ID of the device itself. From this, an entry of <abc,CS5> is added to the content location list 101 stored in the content location list storage unit 44 in the content management device 40.

Figure 17:
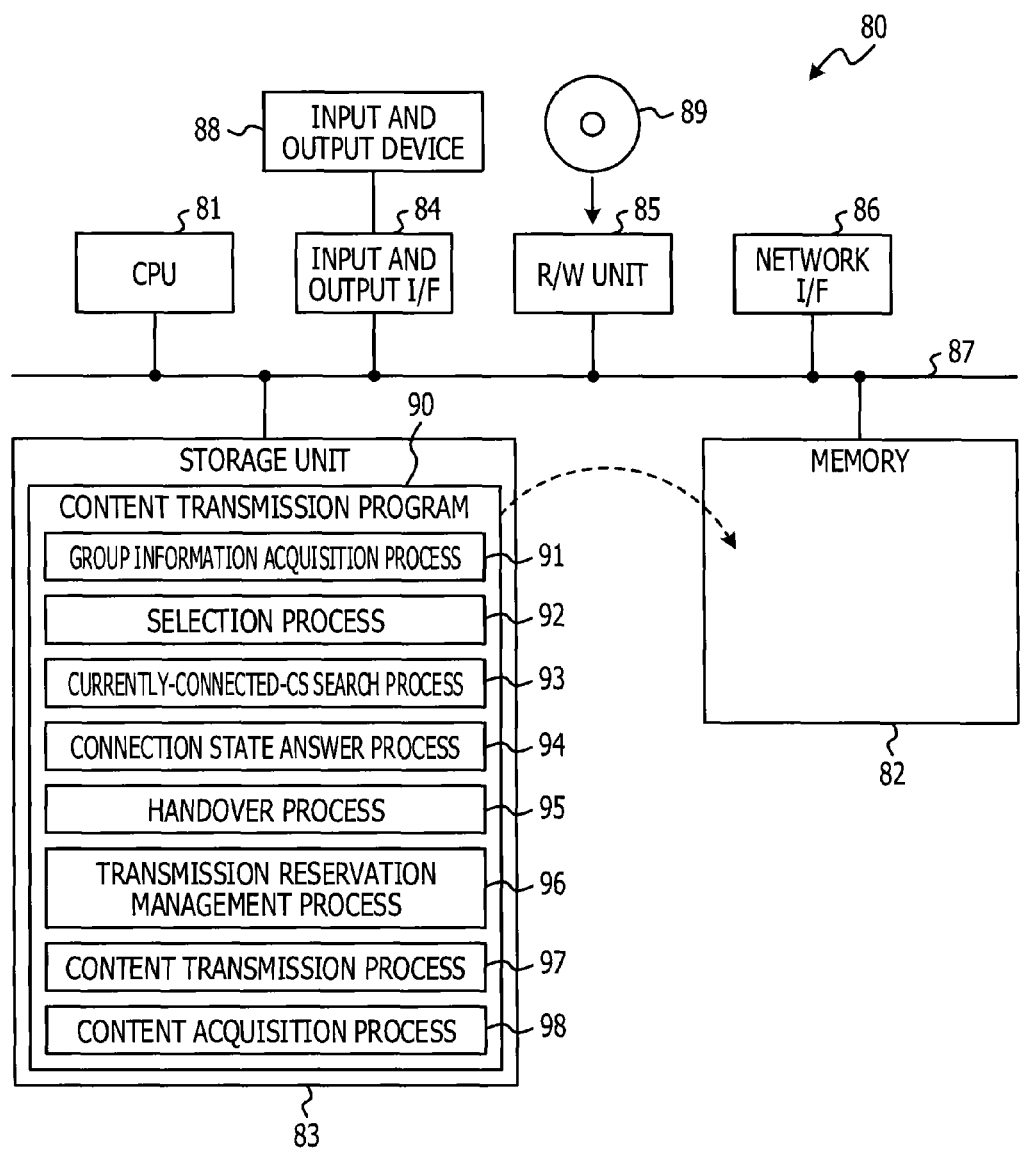
FIG. 17 is a block diagram illustrating a schematic configuration of a computer functioning as a cache server.

The cache server 20n may be realized using a computer 80 illustrated in, for example, in FIG. 17. The computer 80 includes a CPU 81, a memory 82 serving as a temporary storage area, and a non-volatile storage unit 83. In addition, the computer 80 includes an input and output interface (I/F) 84 to which an input and output device 88 is connected. In addition, the computer 80 includes a read and write (R/W) unit 85, which controls reading and writing data from and to a recording medium 89, and a network I/F 86 connected to a network such as the Internet. The CPU 81, the memory 82, the storage unit 83, the input and output I/F 84, the R/W unit 85, and the network I/F 86 are connected to one another through a bus 87.

In addition, the computer 80 is connected to the corresponding storage device 30n through the network I/F 86. In addition, the computer 80 is connected to one of the local networks 701, 702, and 703 through the network I/F 86.

The storage unit 83 may be realized using a hard disk drive (HDD), a solid state drive (SSD), a flash memory, or the like. In the storage unit 83 as a storage medium, a content transmission program 90 for causing the computer 80 to function as the corresponding cache server 20n is stored. The CPU 81 reads and deploys the content transmission program 90 from the storage unit 83 and in the memory 82 and sequentially performs processes included in the content transmission program 90. In addition, the CPU 81 reads pieces of information stored in respective storage units in the corresponding storage device 30n and deploys, in the memory 82, the pieces of information as such respective lists as illustrated in, for example, FIG. 3 and FIG. 6 to FIG. 9.

The content transmission program 90 includes a group information acquisition process 91, a selection process 92, a currently-connected-CS search process 93, a connection state answer process 94, a handover process 95, and a transmission reservation management process 96. In addition, the content transmission program 90 includes a content transmission process 97 and a content acquisition process 98.

By performing the group information acquisition process 91, the CPU 81 operates as the group information acquisition unit 21 illustrated in FIG. 5. In addition, by performing the selection process 92, the CPU 81 operates as the selection unit 22 illustrated in FIG. 5. In addition, by performing the currently-connected-CS search process 93, the CPU 81 operates as the currently-connected-CS search unit 23 illustrated in FIG. 5. In addition, by performing the connection state answer process 94, the CPU 81 operates as the connection state answer unit 24 illustrated in FIG. 5. In addition, by performing the handover process 95, the CPU 81 operates as the handover unit 25 illustrated in FIG. 5. In addition, by performing the transmission reservation management process 96, the CPU 81 operates as the transmission reservation management unit 26 illustrated in FIG. 5. In addition, by performing the content transmission process 97, the CPU 81 operates as the content transmission unit 27 illustrated in FIG. 5. In addition, by performing the content acquisition process 98, the CPU 81 operates as the content acquisition unit 28 illustrated in FIG. 5. From this, the computer 80 that performs the content transmission program 90 turns out to function as the corresponding cache server 20n.

Note that each of the content management device 40 and the user terminals 60n may be realized using a computer including a CPU, a memory, a storage unit, an input and output I/F, a R/W unit, a network I/F, and a bus. In addition, each of the cache servers 20n, the content management device 40, and the user terminals 60n may be realized using, for example, a semiconductor integrated circuit, in more detail, an application specific integrated circuit (ASIC) or the like.

Next, a function of the content transmission system 10 according to the first embodiment will be described. In a case where group registration is performed by one of the user terminals 60n, the neighboring cache server 20n of that user terminal 60n performs content request acquisition processing illustrated in FIG. 18. In addition, upon receiving a transmission request for a content from another cache server 20n, the relevant cache server 20n performs search handover processing illustrated in FIG. 19. In addition, upon receiving a query about a connection state from another cache server, the relevant cache server 20n performs connection state answer processing illustrated in FIG. 20. In addition, in a case where a notice to the transmission reservation management unit 26 is generated from the currently-connected-CS search unit 23 or in a case of receiving a handover request from another cache server 20n, the relevant cache server 20n performs transmission reservation management processing illustrated in FIG. 21. In addition, the cache servers 20n each perform content transmission processing illustrated in FIG. 22. Hereinafter, the individual processing operations will be described in detail.

Figure 18:
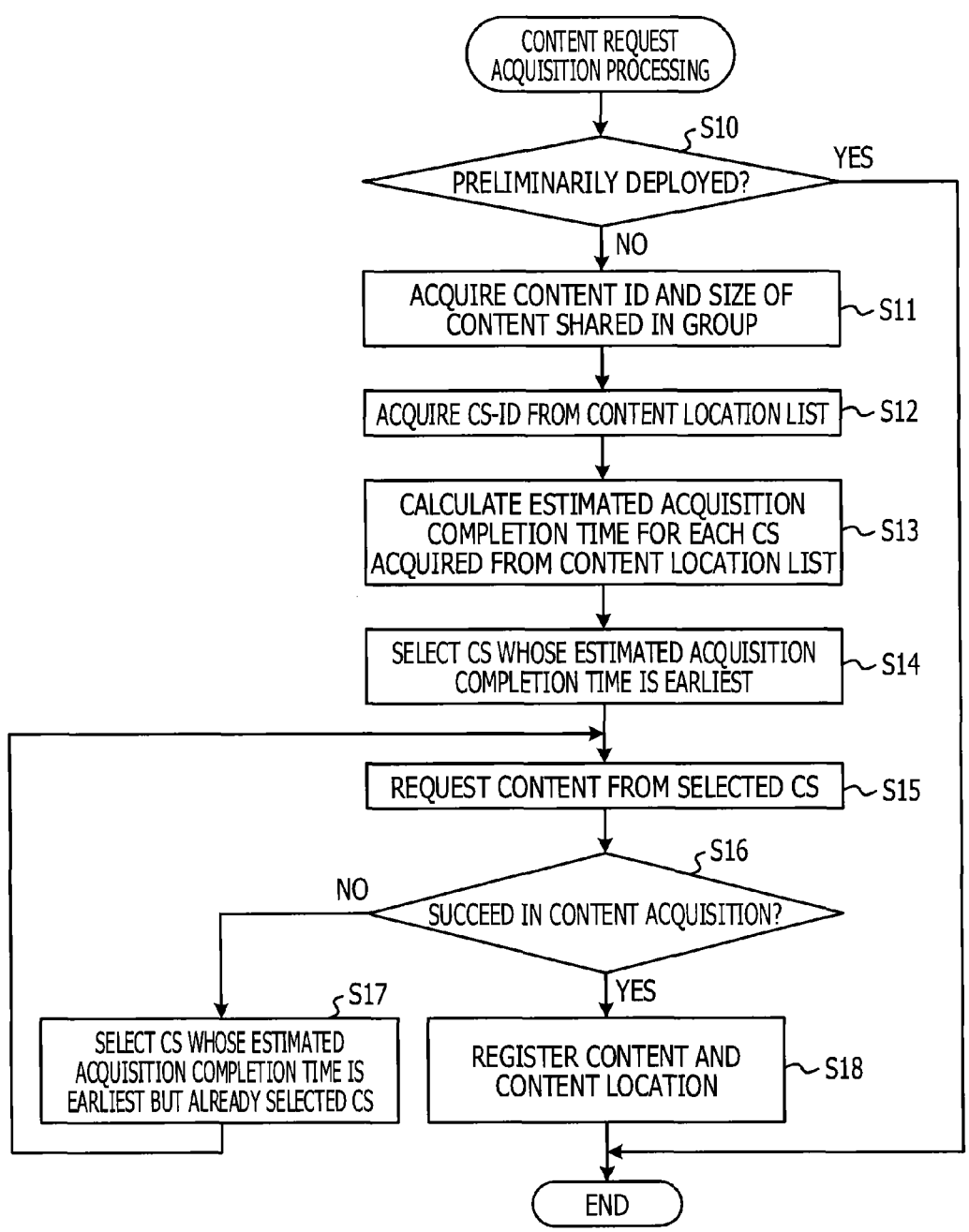
FIG. 18 is a flowchart illustrating an example of content request acquisition processing.

In a step S10 in the content request acquisition processing illustrated in FIG. 18, the group information acquisition unit 21 receives a message of group registration, transmitted from the relevant user terminal 60n, and acquires a group ID included in the message. In addition, based on the group ID acquired by the group information acquisition unit 21, the selection unit 22 determines whether or not a content shared in a group indicated by that group ID is deployed in the device itself. Specifically, the selection unit 22 references the content list 100 stored in the content list storage unit 31 and acquires the content ID of a content corresponding to the group ID. In addition, the selection unit 22 determines whether or not the content corresponding to the acquired content ID is stored in the content storage unit 36 in the corresponding storage device 30n. In a case of being stored, preliminary deployment is completed. Therefore, the content request acquisition processing is terminated without change. In a case of not being stored, the processing makes a shift to a step S11.

In the step S11, the selection unit 22 acquires a content ID and the size of the content from the content list 100 using the group ID as a key. As the content ID, the content ID acquired in the above-mentioned step S10 may be used without change.

Next, in a step S12, using the acquired content ID as a key, the selection unit 22 sends a query to the content management device 40 about the location of the content indicated by that content ID. The content management device 40 references the content location list 101 stored in the content location list storage unit 44 and transmits, as the location of the content, the CS-IDs of the cache servers in which the content is deployed, to the relevant cache server 20*n*. The selection unit 22 acquires the CS-IDs transmitted from the content management device 40.

Next, in a step S13, using the acquired CS-IDs as keys, the selection unit 22 acquires, from the rate list 102, throughputs with the respective cache servers 20*n* corresponding to the relevant CS-IDs. In addition, based on the size of the relevant content, acquired from the content list 100, and a throughput with each of the relevant cache servers 20*n*, the selection unit 22 calculates an acquisition time taken in a case of acquiring the relevant content from each of the relevant cache servers 20*n*. In addition, the selection unit 22 calculates, as the estimated acquisition completion time, time expressed by "current time+the acquisition time".

Next, in a step S14, from among the relevant cache servers 20*n* acquired from the content location list 101, the selection unit 22 selects the cache server 20*n* whose estimated acquisition completion time is the earliest.

Next, in a step S15, the selection unit 22 transmits, to the cache server 20*n* selected in the above-mentioned step S14, a transmission request for, for example, a content intended to be acquired, the transmission request specifying the content ID of the relevant content.

Next, in a step S16, the content acquisition unit 28 determines whether succeeding in acquiring the content or not. In a case of failing in acquiring the content, the processing makes a shift to a step S17. In the step S17, the selection unit 22 selects the cache server 20*n* whose estimated acquisition completion time calculated in the above-mentioned step S13 is the earliest but the cache server 20*n* selected in the above-mentioned step S14, and the processing returns to the step S15.

On the other hand, in a case of succeeding in acquiring the content, the processing makes a shift to a step S18. In the step S18, the content acquisition unit 28 stores the acquired content in the content storage unit 36. In addition, the content acquisition unit 28 transmits, to the content management device 40, information including, for example, the content ID of the content the acquisition of which is completed and the CS-ID of the device itself, and the content transmission processing is terminated. Note that, in a case where the cache servers 20*n* selectable in the step S17 disappear, the content transmission processing is terminated.

Figure 19:
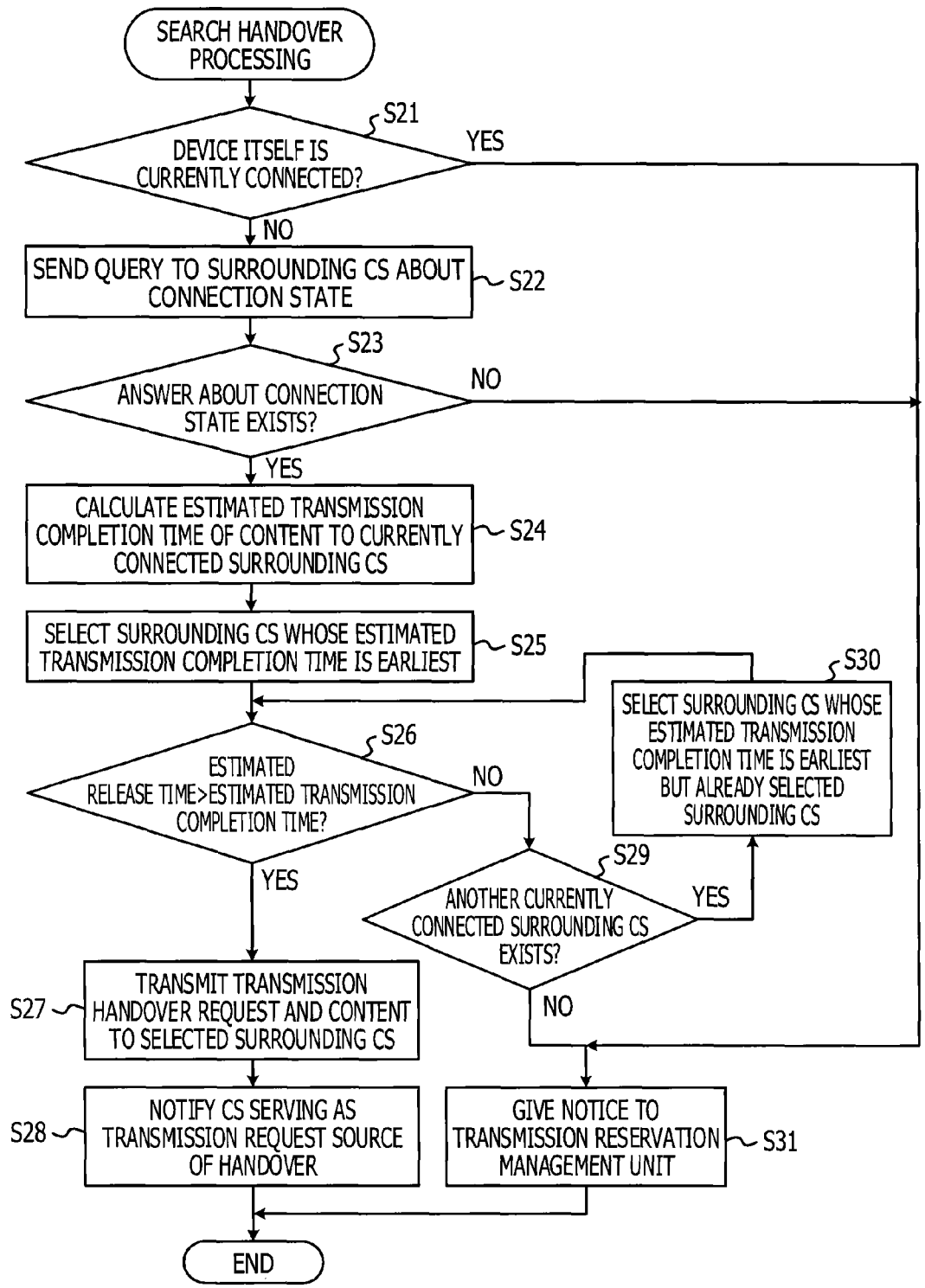
FIG. 19 is a flowchart illustrating an example of search handover processing in the first embodiment.

Next, in a step S21 in the search handover processing illustrated in FIG. 19, the currently-connected-CS search unit 23 references the currently-transmitted-content list 105 and determines whether or not the device itself is currently connected to the cache server 20*n* serving as the transmission request source. In a case of being currently connected, the currently-connected-CS search unit 23 decides to transmit the content from the device itself to the cache server 20*n* serving as the transmission request source, and the processing makes a shift to a step S31. In a case where the device itself is not currently connected to the cache server 20*n* serving as the transmission request source, the processing makes a shift to a step S22.

In the step S22, the currently-connected-CS search unit 23 transmits a query to the cache servers 20*n* surrounding the device itself about whether being currently connected to the cache server 20*n* serving as the transmission request source or nor and in a case of being currently connected thereto, the currently-connected-CS search unit 23 transmits a query thereto about a connection state including estimated release time of that connection.

Next, in a step S23, the currently-connected-CS search unit 23 determines whether or not an answer to the query about the connection state form the surrounding cache server 20*n* is received. In a case of receiving the answer, the processing makes a shift to a step S24. On the other hand, in a case where the answer about the connection state is not received within a predetermined time period, the currently-connected-CS search unit 23 decides to transmit the content from the device itself to the cache server 20*n* serving as the transmission request source and the processing makes a shift to the step S31.

In the step S24, the currently-connected-CS search unit 23 calculates the estimated transmission completion time in a case of transmitting the content from the device itself to each of the surrounding cache servers 20*n* that transmit answers. Next, in a step S25, the currently-connected-CS search unit 23 selects the surrounding cache server 20*n* whose estimated transmission completion time calculated in the above-mentioned step S24 is the earliest.

Next, in a step S26, the currently-connected-CS search unit 23 determines whether or not the estimated transmission completion time in a case of transmitting the content to the selected surrounding cache server 20*n* is earlier than estimated release time in the selected surrounding cache server 20*n*. In other words, it is determined whether or not it is possible to transmit the content to the relevant cache server 20*n* before the estimated release time in the selected surrounding cache server 20*n*. In a case where the estimated transmission completion time is earlier, the processing makes a shift to a step S27, and in a case where the estimated release time is earlier, the processing makes a shift to a step S29.

In the step S27, the currently-connected-CS search unit 23 decides the selected surrounding cache server 20*n* as the cache server 20*n* to serve as a handover destination and gives a notice to the handover unit 25. In addition, the handover unit 25 transmits, to the cache server 20*n* serving as the handover destination, a content acquired from the content storage unit 36, along with a transmission handover request specifying the CS-ID of the cache server 20*n* serving as the transmission request source and the content ID of the content the transmission of which is to be handed over.

Next, in a step S28, the handover unit 25 gives a notice to the cache server 20*n* serving as the transmission request source to the effect that transmission of the content is handed over to the cache server 20*n* serving as the handover destination, and terminates the search handover processing.

On the other hand, in the step S29, the currently-connected-CS search unit 23 determines whether or not another surrounding cache server 20*n*, from which an answer about the connection state is received in the above-mentioned step S23, exits. In a case where the other surrounding cache server 20*n* exits, the processing makes a shift to a step S30, the currently-connected-CS search unit 23 selects the surrounding cache server 20*n* whose estimated transmission completion time is the earliest but the surrounding cache server 20*n* already selected in the above-mentioned step S25, and the processing returns to the step S26. On the other hand, in a case where no other surrounding cache server 20*n* exists, the currently-connected-CS search unit 23 decides to transmit the content from the device itself to the cache server 20*n* serving as the transmission request source, and the processing makes a shift to the step S31.

In the step S31, the currently-connected-CS search unit 23 notifies the transmission reservation management unit 26 of information including the CS-ID of the cache server 20*n* serving as the transmission request source, a content ID specified by the transmission request, and the size of a content indicated by that content ID. Note that the size of the content is acquired from the content list 100. In addition, in a case where the processing makes a shift to the present step through the above-mentioned step S29, the transmission reservation management unit 26 is additionally notified of information of the estimated release time included in the answer about the connection state received in the above-mentioned step S23. In addition, the search handover processing is terminated.

Figure 20:
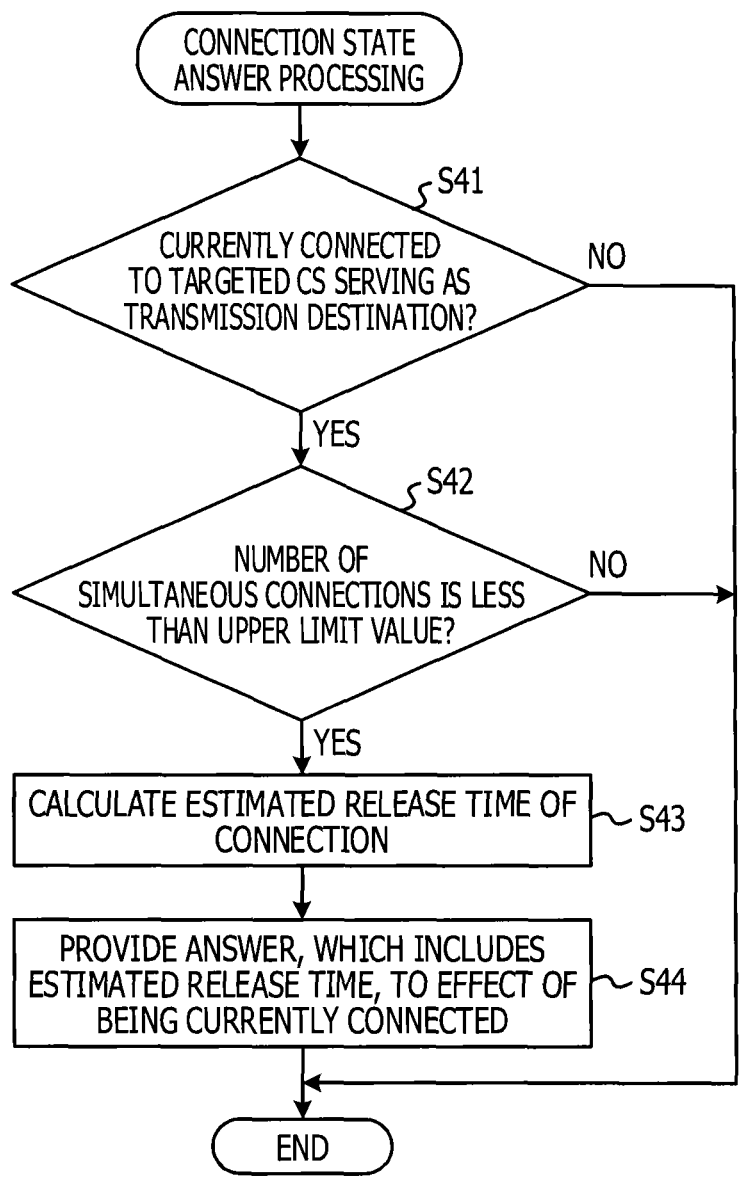
FIG. 20 is a flowchart illustrating an example of connection state answer processing in the first embodiment.

Next, in a step S41 in the connection state answer processing illustrated in FIG. 20, the connection state answer unit 24 determines whether or not an entry including a CS-ID specified in a received query about a connection state exists in the currently-transmitted-content list 105. In a case where the relevant entry exists, being currently connected to the cache server 20n serving as a transmission request source, indicated by the CS-ID specified by the query about the connection state, is determined, and the processing makes a shift to a step S42. In a case where the relevant entry does not exist, in other words, in a case of not being currently connected to the cache server 20n serving as the transmission request source, the connection state answer processing is terminated without providing an answer about the connection state.

In the step S42, the connection state answer unit 24 obtains the current number of simultaneous connections by calculating the number of entries in the currently-transmitted-content list 105. In addition, by comparing the current number of simultaneous connections with the upper limit value of the number of simultaneous connections, defined in the setting information table 103, the connection state answer unit 24 determines whether or not the number of simultaneous connections is less than the upper limit value. In a case of being less than the upper limit value, the processing makes a shift to a step S43, and in a case of reaching the upper limit value, the connection state answer processing is terminated without providing an answer about the connection state.

In the step S43, the connection state answer unit 24 acquires, from the rate list 102, a throughput with the cache server 205 serving as a transmission request source and acquires a "remaining size" form a corresponding entry in the currently-transmitted-content list 105. In addition, the estimated release time of a connection is calculated using estimated release time=current time+(the remaining size/the throughput).

Next, in a step S44, the connection state answer unit 24 provides, to a query source, an answer to the effect of being currently connected to the cache server 20n serving as the transmission request source, the answer including the estimated release time calculated in the above-mentioned step S43, and terminates the connection state answer processing.

Figure 21:
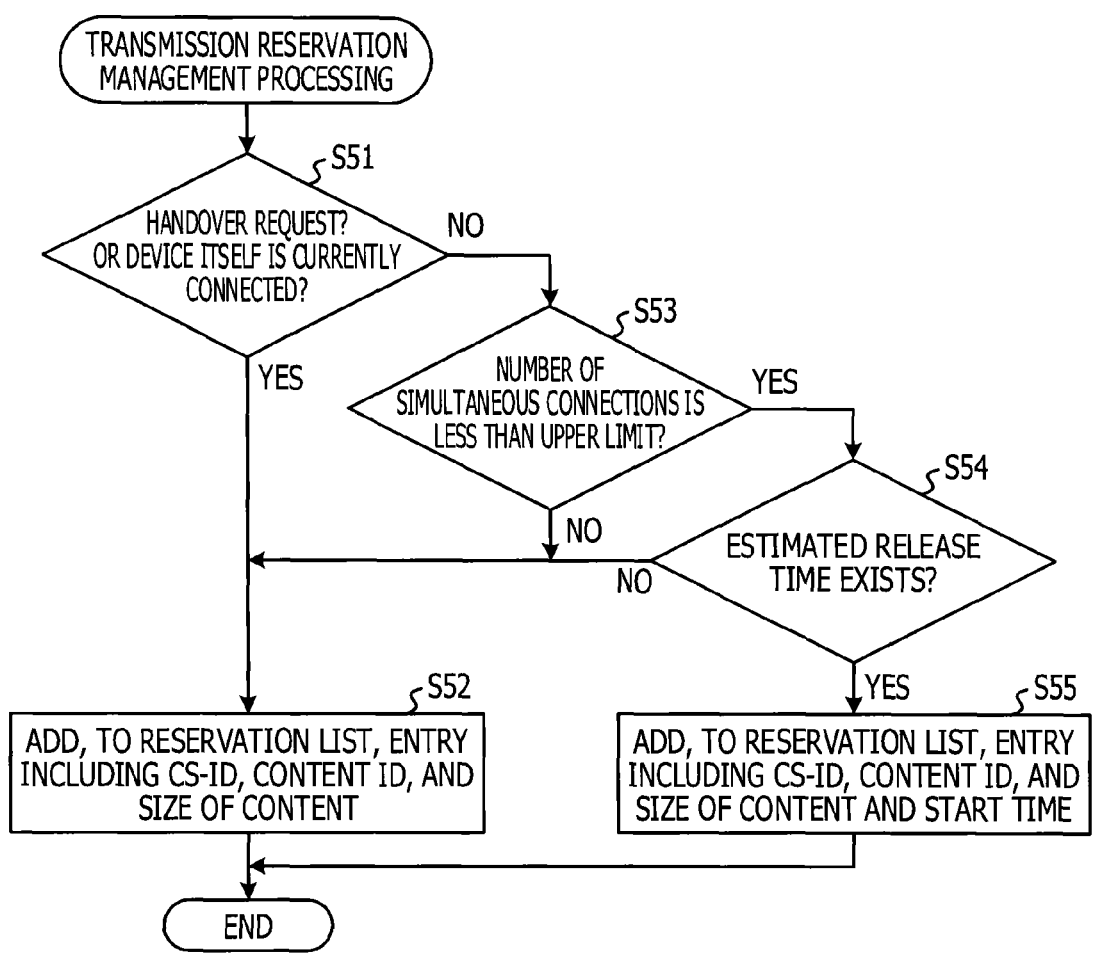
FIG. 21 is a flowchart illustrating an example of transmission reservation management processing.

Next, in a step S51 in the transmission reservation management processing illustrated in FIG. 21, the transmission reservation management unit 26 determines whether a received notice or the like is a handover request or a notice from the currently-connected-CS search unit 23, which indicates that the device itself is currently connected to the cache server 20n serving as a transmission request source. In a case of affirmative determination, the processing makes a shift to a step S52, and the transmission reservation management unit 26 adds, to the reservation list 104, an entry including a CS-ID, a content ID, and the size of a content and terminates the transmission reservation management processing.

On the other hand, in a case where since it is difficult to search for the cache server 20n to serve as a handover destination, the received notice or the like is a notice from the currently-connected-CS search unit 23, which indicates that a content is to be transmitted from the device itself to the cache server 20n serving as a transmission request source, the processing makes a shift to a step S53. In the step S53, the transmission reservation management unit 26 counts the number of entries in the currently-transmitted-content list 105, obtains the current number of simultaneous connections of the device itself, compares the current number of simultaneous connections with the upper limit value of the number of simultaneous connections defined in the setting information table 103, and determines whether or not the number of simultaneous connections is less than the upper limit value. In a case of being less than the upper limit value, the processing makes a shift to a step S54, and in a case of reaching the upper limit value, the processing makes a shift to the step S52.

In the step S54, the transmission reservation management unit 26 determines whether or not information of estimated release time is included in the received notice. In a case of being included, the processing makes a shift to a step S55, and in a case of not being included, the processing makes a shift to the step S52. In the step S55, the transmission reservation management unit 26 adds, to the reservation list 104, an entry to which the information of the estimated release time included in the notice is added as "start time" along with information of the CS-ID, the content ID, and the size of a content, included in the notice. In addition, the transmission reservation management processing is terminated.

Figure 22:
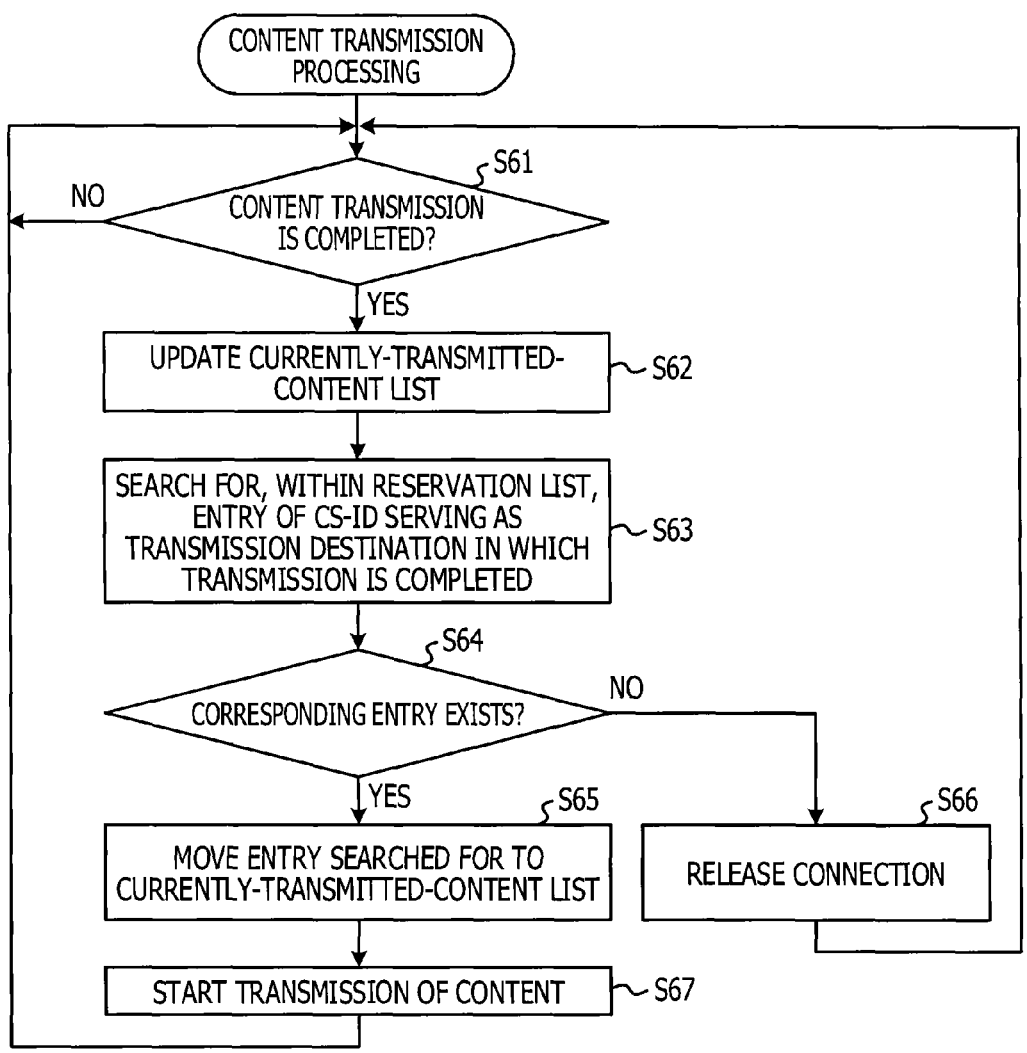
FIG. 22 is a flowchart illustrating an example of content transmission processing.

Next, in a step S61 in the content transmission processing illustrated in FIG. 22, the content transmission unit 27 acquires a remaining data size before transmission completion of a currently transmitted content and updates the "remaining size" in the currently-transmitted-content list 105. In addition, by determining whether or not an entry in which the "remaining size" in the currently-transmitted-content list 105 becomes "0" exists, the transmission reservation management unit 26 determines whether or not transmission of a content indicated by that entry is completed. In an entry in the currently-transmitted-content list 105, indicated by, for example, A in FIG. 23, the "remaining size" becomes "0". Therefore, it is possible to determine that transmission of a content indicated by that entry is completed. In a case where the transmission of a content is completed, the processing makes a shift to a step S62, and in a case where the transmission of a content is not completed, the determination of the present step is repeated. In addition, in a case where the currently-transmitted-content list 105 is empty due to an initial state or the like, affirmative determination is performed in the present step and the processing makes a shift to the step S62.

Figure 23:
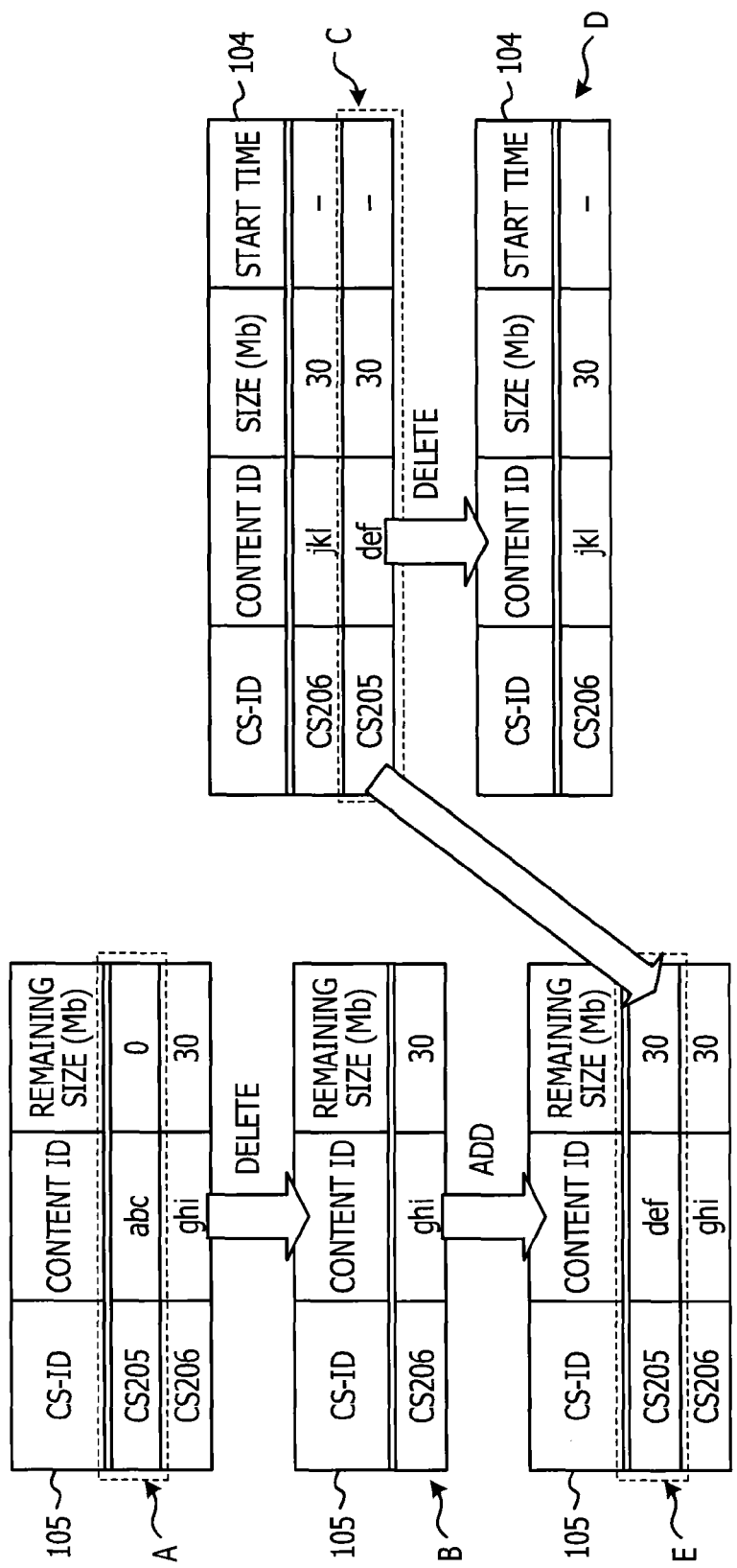
FIG. 23 is a diagram illustrating an example of the transmission reservation management processing.

In the step S62, the transmission reservation management unit 26 deletes, from the currently-transmitted-content list 105, an entry indicating that transmission of a content is completed, and updates the currently-transmitted-content list 105 in such a manner as illustrated by B in FIG. 23.

Next, in a step S63, within the reservation list 104, the transmission reservation management unit 26 searches for an entry including the same CS-ID as the CS-ID of the entry deleted in the above-mentioned step S62. In a case of deleting an entry of CS-ID=CS205 in such a manner as illustrated by, for example, A in FIG. 23, an entry of CS-ID=CS205 is searched for within the reservation list 104 in such a manner as illustrated by C in FIG. 23. In addition, in a case where the currently-transmitted-content list 105 is empty due to the initial state or the like, one entry for each CS-ID is searched for within the reservation list 104 while starting from the beginning thereof. Note that, at the time of searching for an entry within the reservation list 104, entries, in each of which time prior to current time is registered in the "start time", are not included in targets of searching.

Next, in a step S64, the transmission reservation management unit 26 determines whether or not the corresponding entry is searched for within the reservation list 104. In a case of being searched for, the processing makes a shift to a step S65, and in a case of not being searched for, the processing makes a shift to a step S66.

In the step S65, the transmission reservation management unit 26 moves the entry searched for within the reservation list 104 to the currently-transmitted-content list 105 while excluding the item of the "start time". Accordingly, the relevant entry is deleted from the reservation list 104 in such a manner as illustrated by D in FIG. 23 and the relevant entry is added to the currently-transmitted-content list 105 in such a manner as illustrated by E in FIG. 23.

On the other hand, in the step S66, a connection with the cache server 20n indicated by the CS-ID of the entry deleted from the currently-transmitted-content list 105 in the above-mentioned step S62 is released. In other words, in a case where the relevant entry is searched for within the reservation list 104, a state where a connection with the cache server 20n in which transmission of a content finishes is maintained without being released occurs.

In a step S67, the content transmission unit 27 acquires, from the content storage unit 36, a content indicated by a content ID included in the entry added to the currently-transmitted-content list 105. In addition, the content transmission unit 27 confirms the presence or absence of a connection with the cache server 20n indicated by a CS-ID included in the entry added to the currently-transmitted-content list 105. In a case of not being connected, the content acquired from the content storage unit 36 is transmitted after a connection is established. As described above, in a case where an entry is newly added in association with transmission completion of a content, a connection with the cache server 20n serving as the transmission request source is maintained. Therefore, using the existing connection, a content is transmitted. Upon starting transmission of the content, the processing returns to the step S61.

Note that, in a case where a connection with the cache server 20n serving as the transmission request source is newly established, such as a case where an entry is newly added to the empty currently-transmitted-content list 105, in some cases it is difficult to establish a connection. A case where the number of simultaneous connections of, for example, the device itself or the cache server 20n serving as the transmission request source reaches the upper limit value may be cited. In this case, establishment of a connection is performed at predetermined time intervals.

As described above, in the content transmission system 10 according to the first embodiment, in a case where one of the cache servers 20n is requested to transmit a content, the relevant cache server 20n searches for a cache server already connected to the cache server serving as a transmission request source of the content. In a case where a currently connected cache server exists, an increase in the traffic amount of the network is suppressed by handing over transmission of the content to that cache server. In addition, using the existing connection, it is possible to sequentially transmit contents without spaces therebetween within the limit of the number of simultaneous connections. Therefore, it is possible to reduce a time period that elapses before transmitting of a content to the cache server serving as the transmission request source is completed.

In addition, at the time of searching for the cache server to serve as a handover destination, it is possible to reduce the traffic of communication utilizing the wide area network, by searching within the surrounding cache servers of the device itself. Therefore, it is possible to achieve reduction of communication costs.

In addition, in a case where candidates for the cache server to serve as a handover destination exist, a cache server whose estimated transmission completion time is earlier in a case of transmitting a content from the device itself to the individual surrounding cache servers is preferentially decided as the cache server to serve as the handover destination. From this, it is possible to sooner complete the preliminary deployment of a content in the cache server serving as a transmission request source.

Note that, in the first embodiment, a case where a content is transferred after waiting for release of a connection between another cache server and the cache server serving as the transmission request source is described regarding a case of managing using the item of the "start time" provided in the reservation list but not limited to this. For example, an entry may be added to the reservation list after waiting for release of a connection between another cache server and the cache server serving as the transmission request source.

Second Embodiment

Next, the second embodiment will be described. Note that the same symbol is assigned to the same portion as that in the content transmission system 10 according to the first embodiment and the detailed description thereof will be omitted.

FIG. 5 illustrates a cache server 20nA and a storage device 30nA according to the second embodiment. As illustrated in FIG. 5, the storage devices 30nA each include the content list storage unit 31, the rate list storage unit 32, a setting information storage unit 33A, the reservation list storage unit 34, the currently-transmitted-content list storage unit 35, and the content storage unit 36.

As illustrated in, for example, FIG. 24, in the setting information storage unit 33A, a setting information table 103A that defines an upper limit value of the number of held reservation lists is stored in addition to the upper limit value of the number of simultaneous connections and the upper limit time of the preliminary deployment. The detail of the upper limit value of the number of held reservation lists will be described later.

The cache servers 20nA each include the group information acquisition unit 21, the selection unit 22, a currently-connected-CS search unit 23A, a connection state answer unit 24A, the handover unit 25, the transmission reservation management unit 26, the content transmission unit 27, and the content acquisition unit 28.

In the same way as the connection state answer unit 24 in the first embodiment, to a query about a connection state, transmitted from another cache server 20nA, the connection state answer unit 24A provides an answer on a state of a connection with the cache server 20nA that serves as a transmission request source and is specified by the query. At this time, the connection state answer unit 24A determines whether or not the number of entries in the reservation list 104 is less than the upper limit value of the number of held reservation lists defined in the setting information table 103A. In addition to a case where being currently connected to the cache server 20nA serving as the transmission request source and the number of simultaneous connections is less than the upper limit value, in a case where the number of entries in the reservation list 104 is less than the upper limit value, the connection state answer unit 24A calculates the estimated release time of a connection with the cache server 20nA serving as the transmission request source.

In addition, the connection state answer unit 24A provides, to the query source, an answer to the effect of being currently connected to the cache server 20nA serving as the transmission request source, the answer including the estimated release time and the number of simultaneous connections. In other words, in a case where the number of entries in the reservation list 104 is greater than or equal to the upper limit value, no connection with the cache server 20nA serving as the transmission request source is considered to be established and no answer about the connection state is provided. That the number of entries in the reservation list 104 is large indicates that the number of contents that are held by that cache server 20nA and wait to be transmitted is large. Therefore, in a case where the number of entries in the reservation list 104 is greater than or equal to the upper limit value, further transmission of a content is not accepted, thereby suppressing an increase in the number of held contents. From this, it is possible to avoid expansion in the range of an influence in, for example, a case where a failure occurs in one of the cache servers 20nA.

In the same way as the currently-connected-CS search unit 23 in the first embodiment, based on an answer to the query about the connection state from the surrounding cache server 20nA, the currently-connected-CS search unit 23A decides the cache server 20nA to serve as a handover destination. In the second embodiment, a decision method for the cache server 20nA to serve as the handover destination in a case where answers about the connection state are received from two or more of the cache servers 20nA and two or more of the cache servers 20nA each capable of completing transmission of a content before the estimated release time exist is different from the first embodiment. In the second embodiment, the currently-connected-CS search unit 23A preferentially decides, as the cache server 20nA to serve as the handover destination, one of the cache servers 20nA where the number of simultaneous connections included in the corresponding answer is smaller.

Next, a function of the content transmission system 10 according to the second embodiment will be described while focusing on a portion different from the first embodiment. Upon receiving a transmission request for a content from another cache server 20nA, one of the cache servers 20n performs search handover processing illustrated in FIG. 24. In addition, upon receiving a query about a connection state from another cache server 20nA, the relevant cache server 20n performs connection state answer processing illustrated in FIG. 26. Note that the same symbol is assigned to the same processing as that in the first embodiment and the detailed description thereof will be omitted.

Figure 25:
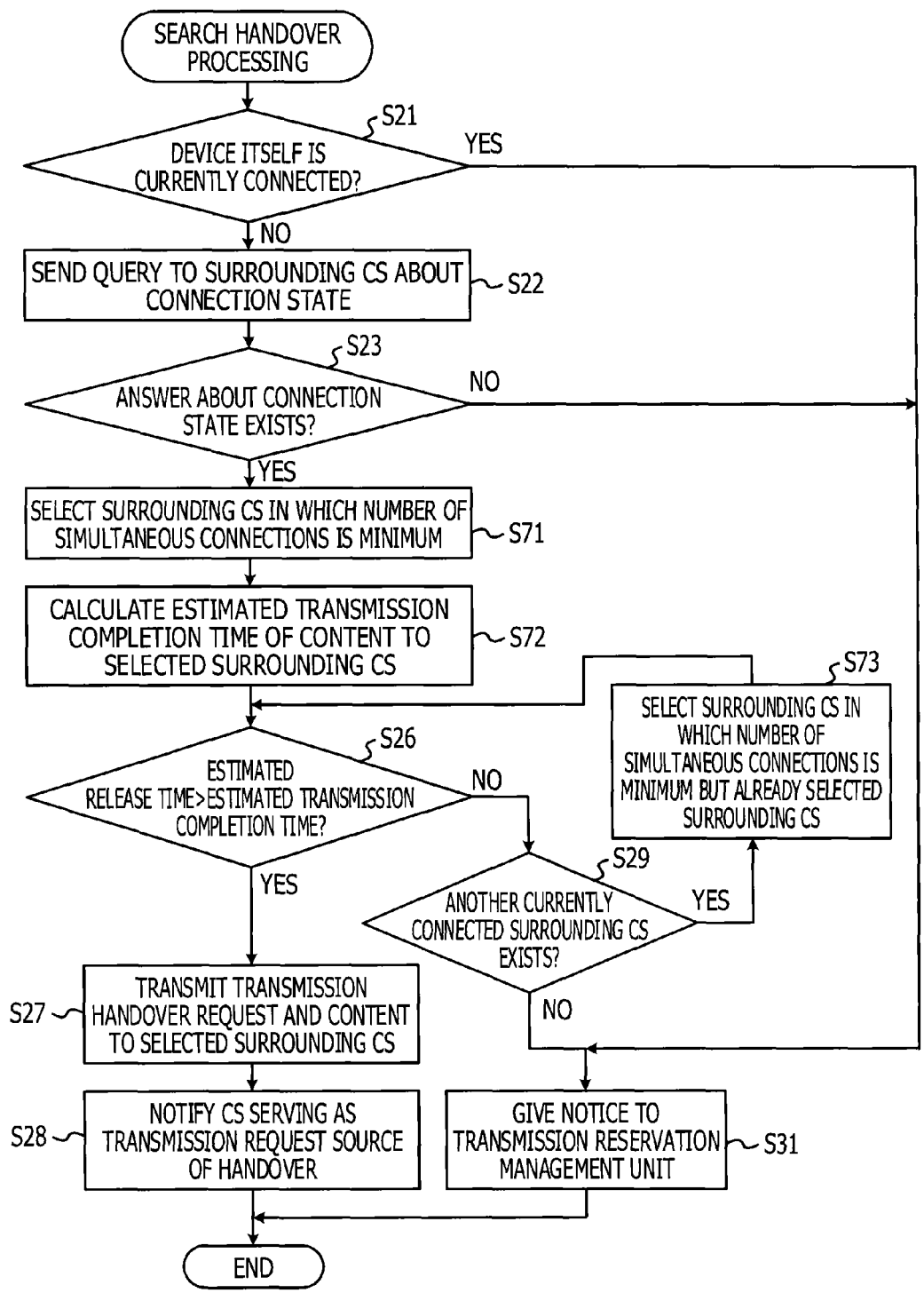
FIG. 25 is a flowchart illustrating an example of search handover processing in the second embodiment.

In a case where, in the step S23 in the search handover processing illustrated in FIG. 25, the currently-connected-CS search unit 23A receives, from the surrounding cache server 20nA, an answer to the query about the connection state, the processing makes a shift to a step S71.

In the step S71, the currently-connected-CS search unit 23A selects the surrounding cache server 20nA in which the number of simultaneous connections included in the answer is a minimum. Next, in a step S72, the currently-connected-CS search unit 23A calculates the estimated transmission completion time in a case of transmitting a content from the device itself to the surrounding cache server 20nA selected in the above-mentioned step S71, and the processing makes a shift to the step S26.

In addition, if affirmative determination is performed in the step S29, the processing makes a shift to a step S73, and the currently-connected-CS search unit 23A selects the surrounding cache server 20nA in which the number of simultaneous connections is a minimum but the surrounding cache server 20nA already selected in the above-mentioned step S72. In addition, the processing returns to the step S26.

Figure 26:
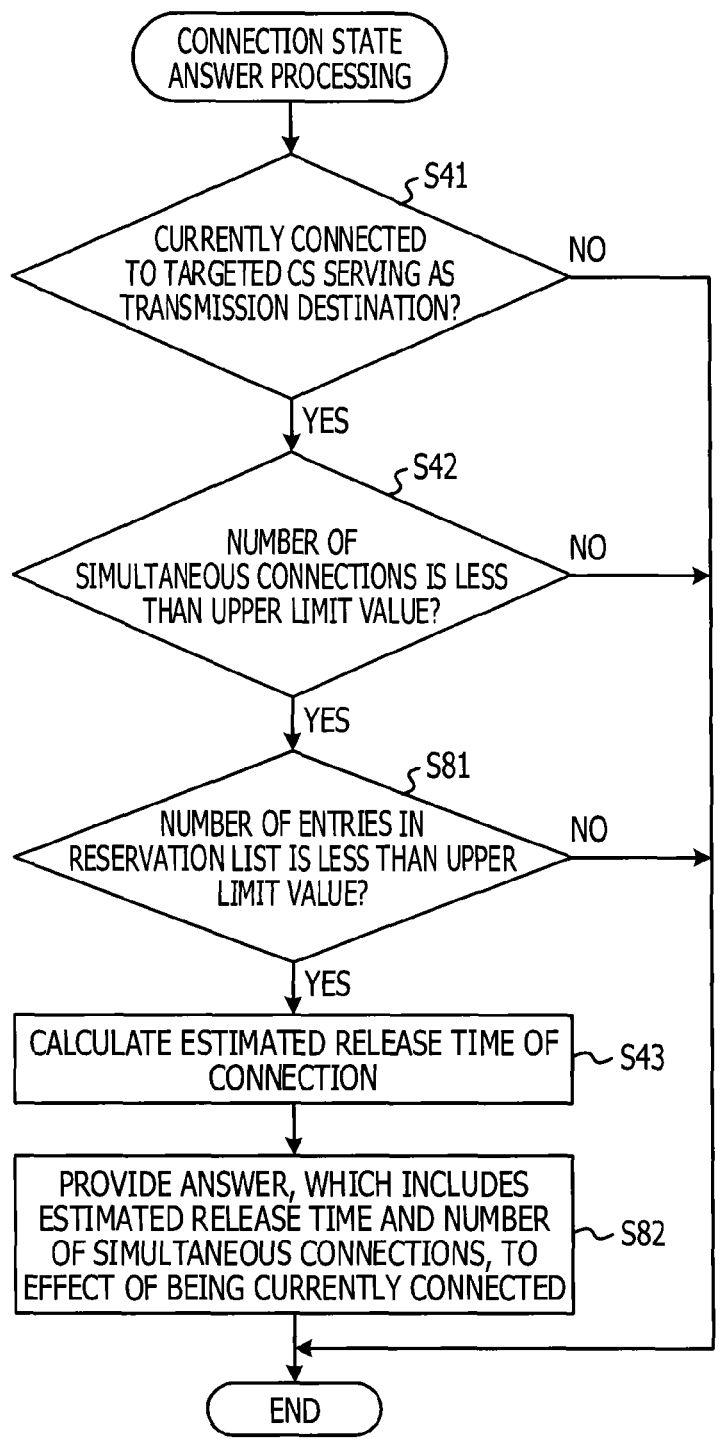
FIG. 26 is a flowchart illustrating an example of connection state answer processing in the second embodiment.

Next, if affirmative determination is performed in the step S42 in the connection state answer processing illustrated in FIG. 26, the processing makes a shift to a step S81, and the connection state answer unit 24A determines whether or not the number of entries in the reservation list 104 is less than the upper limit value of the number of held reservation lists, defined in the setting information table 103A. In a case of being less than the upper limit value, the processing makes a shift to a step S43, and in a case of being greater than or equal to the upper limit value, the connection state answer processing is terminated without providing an answer about the connection state.

In addition, in a step S82 subsequent to the step S43, the connection state answer unit 24A provides, to the query source, an answer to the effect of being currently connected to the cache server 20nA serving as the transmission request source, the answer including the estimated release time and the number of simultaneous connections, and terminates the connection state answer processing.

As described above, in the content transmission system 10 according to the second embodiment, in a case of being requested to transmit a content, one of the cache servers 20nA searches for a cache server already connected to the cache server serving as a transmission request source of the content. In addition, in a case where a currently connected cache server exists, transmission of the content is handed over to that cache server. Accordingly, while suppressing an increase in the traffic amount of the network in the same way as in the first embodiment, within the limit of the number of simultaneous connections, it is possible to reduce a time period that elapses before transmitting of a content to the cache server serving as the transmission request source is completed.

In addition, in a case where candidates for the cache server to serve as a handover destination exist, a cache server where the number of simultaneous connections is smaller is preferentially decided as the cache server to serve as the handover destination. From this, it is possible to reduce a load on the cache server serving as the handover destination.

Note that while, in the above-mentioned individual embodiments, a case where a trigger for preliminary deployment of a content based on a cache server is group registration (subscription) from a user terminal is described, embodiments are not limited to this. A connection performed before a content request from a user terminal, such as login by a user or a connection of the user terminal to an access point corresponding to a cache server, may be adopted as a trigger.

In addition, while, in the above-mentioned individual embodiments, a case where transmission of a content is handed over if the estimated transmission completion time of the content from the device itself to a surrounding cache server is earlier than the estimated release time of a connection of the surrounding cache server is described, embodiments are not limited to this. If a time period before, for example, the estimated release time is long, a case where, as a result of handover, it is difficult to deploy a content in the cache server serving as a transmission request source before the upper limit time of preliminary deployment may occur. Therefore, an upper limit time of waiting for transmission is provided. In addition, in a case where a time from the current time to the estimated release time exceeds the upper limit time of waiting for transmission, even if the estimated transmission completion time is earlier than the estimated release time, a content may be transmitted from the device itself to the cache server serving as the transmission request source without handing over transmission of the content. The upper limit time of waiting for transmission may be defined by taking into account the upper limit time of the preliminary deployment and the transmission time of a content in a case of handing over the transmission of the content to a surrounding cache server.

In addition, while, in the above-mentioned individual embodiments, a case where a cache server, from which a content is to be acquired, is selected based on various kinds of information stored in the corresponding storage device $30n$ or $30nA$ is described, embodiments are not limited to this. At the time of selecting a cache server, desired information may be acquired by, for example, sending a query to the content management device 40 or another cache server.

In addition, while, in the above-mentioned individual embodiments, a case where the content location list 101 is stored in the content management device 40 is described, embodiments are not limited to this. Separately from the content management device 40, a content location list management device that manages the content location list 101 may be provided.

In addition, while, in the above-mentioned individual embodiments, a case where a different content is deployed in one cache server in response to different group registration from a different user is described as an example, embodiments are not limited to this. Different contents only have to be transmitted to one cache server, and in the same way, the present technology may be applied to a case where different contents are deployed in, for example, a cache server in which one user performs group registration.

In addition, while, in the above description, an embodiment in which the content transmission program 90 is preliminarily stored (installed) in the storage unit 83 is described, the content transmission program 90 may be provided in a form of being recorded in a storage medium such as a CD-ROM or a DVD-ROM.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A content transmission method comprising:
   searching, when a first information processing device receives a transmission request for a first content from a second information processing device, for a third information processing device within information processing devices, the third information processing device having a connection with the second information processing device and currently transmitting a second content to the second information processing device;
   transmitting to the third information processing device, by the first information processing device, the first content and an instruction to transmit the transmitted first content from the third information processing device to the second information processing device in accordance with the transmission request;
   during the searching for the third information processing device, acquiring an estimated release time of a connection with the second information processing device from each of the information processing devices; and
   selecting, as the third information processing device from among the information processing devices, an information processing device with which the transmission of the first content from the first information processing device is to be completed before the estimated release time.

2. The content transmission method according to claim 1, wherein the estimated release time of the selected information processing device is earliest among the information processing devices.

3. The content transmission method according to claim 1, further comprising:
   preferentially selecting, as the third information processing device, an information processing device with which a number of simultaneous connections with other information processing devices is fewest.

4. The content transmission method according to claim 1, further comprising:
   during the searching for the third information processing device, selecting the third information processing device from among the information processing devices that have a number of contents waiting for transmission less than a predetermined upper limit value.

5. The content transmission method according to claim 1, further comprising:
   during the searching for the third information processing device, selecting the third information processing device from among the information processing devices that have a number of hops with the first information processing device less than or equal to a predetermined number.

6. The content transmission method according to claim 1, further comprising:
   during the searching for the third information processing device, selecting the third information processing device from among the information processing devices that have a number of simultaneous connections, less than a predetermined upper limit value of connections, with other information processing devices.

7. The content transmission method according to claim 1, further comprising:
   notifying the second information processing device, by the first information processing device, that the third information processing device is instructed to transmit the first content, during the transmitting.

8. A content transmission device comprising:
   a memory; and
   a processor coupled to the memory and configured to:
   search for a first information processing device within information processing devices in a case of receiving a transmission request for a first content from a second information processing device, the first information processing device having a connection with the second information processing device and currently transmitting a second content to the second information processing device;

transmit, to the first information processing device, the first content and an instruction to transmit the transmitted first content from the first information processing device to the second information processing device;

acquire an estimated release time of a connection with the second information processing device from each of the information processing devices, during the search for the first information processing device; and select, as the first information processing device from among the information processing devices, an information processing device with which the transmission of the first content to is to be completed before the estimated release time.

9. A non-transitory computer-readable medium storing therein a program that causes a computer to execute a process, the process comprising:

searching, when a first information processing device receives a transmission request for a first content from a second information processing device, for a third information processing device within information processing devices, the third information processing device having a connection with the second information processing device and currently transmitting a second content to the second information processing device;

transmitting to the third information processing device, by the first information processing device, the first content and an instruction to transmit the transmitted first content from the third information processing device to the second information processing device in accordance with the transmission request;

during the searching for the third information processing device, acquiring an estimated release time of a connection with the second information processing device from each of the information processing devices; and selecting, as the third information processing device from among the information processing devices, an information processing device with which the transmission of the first content from the first information processing device is to be completed before the estimated release time.

* * * * *